(12) United States Patent
Riley

(10) Patent No.: US 10,620,813 B1
(45) Date of Patent: Apr. 14, 2020

(54) SYSTEMS AND METHODS FOR AUTOMATICALLY DETERMINING SYSTEM SPECIFICATIONS FOR HVAC COMPONENTS

(71) Applicant: Comfort Depot TM, LLC, Clinton Township, MI (US)

(72) Inventor: Justin T. Riley, Frederick, MD (US)

(73) Assignee: COMFORT DEPOT TM, LLC, Clinton Township, MI (US)

(*) Notice: Subject to any disclaimer, the term of this patent is extended or adjusted under 35 U.S.C. 154(b) by 0 days.

(21) Appl. No.: 16/375,214

(22) Filed: Apr. 4, 2019

Related U.S. Application Data

(60) Provisional application No. 62/794,263, filed on Jan. 18, 2019.

(51) Int. Cl.
| | | |
|---|---|---|
| *G06F 3/0484* | (2013.01) | |
| *G06Q 50/06* | (2012.01) | |
| *G06Q 30/02* | (2012.01) | |
| *G06F 3/0481* | (2013.01) | |

(52) U.S. Cl.
CPC ........ *G06F 3/04847* (2013.01); *G06F 3/0481* (2013.01); *G06Q 30/0283* (2013.01); *G06Q 50/06* (2013.01)

(58) Field of Classification Search
CPC .............. G06F 3/04847; G06F 3/0481; G06Q 30/0283; G06Q 50/06
See application file for complete search history.

(56) References Cited

U.S. PATENT DOCUMENTS

| | | | | |
|---|---|---|---|---|
| 4,955,345 A | * | 9/1990 | Brown | ................ F02D 41/0025 123/381 |
| 5,751,134 A | * | 5/1998 | Hoerner | ............. G01R 31/3648 320/124 |
| 7,330,552 B1 | * | 2/2008 | LaMance | ................ H04S 5/005 381/17 |
| 8,324,953 B1 | * | 12/2012 | Koren | ................... H04B 1/0475 327/180 |
| 9,555,869 B1 | * | 1/2017 | Arbuckle | ............. B63H 21/213 |
| 9,954,553 B1 | * | 4/2018 | Langhammer | .... H03M 13/1595 |

(Continued)

OTHER PUBLICATIONS

MathWorks, "What are Adaptive Lookup Tables?," May 10, 2017, https://web.archive.org/web/20170510220301/https://www.mathworks.com/help/sldo/ug/what-are-adaptive-lookup-tables.html.*

Carrier, "Building System Optimizer," Sep. 29, 2015, https://web.archive.org/web/20150929005541/https://www.carrier.com/commercial/en/us/software/hvac-system-design/building-system-optimizer/.*

(Continued)

*Primary Examiner* — Ryan Barrett
(74) *Attorney, Agent, or Firm* — Finnegan, Henderson, Farabow, Garrett & Dunner LLP

(57) ABSTRACT

Systems and methods for automatically determining system specifications for one or more HVAC components are provided. In one embodiment, a GUI is generated by a processor and presented to a user. The processor may request information relating to a building where one or more HVAC components are to be installed. The user may provide one or more identifiers through the GUI. The processor may use the one or more identifiers to access a database and automatically determine at least one characteristic associated with the building. The processor may use the determined characteristic to determine one or more system specifications for the HVAC components. The processor may use the GUI to display the determined system specifications for the one or more HVAC components.

16 Claims, 12 Drawing Sheets

(56) References Cited

U.S. PATENT DOCUMENTS

| | | | | |
|---|---|---|---|---|
| 2003/0074164 | A1* | 4/2003 | Simmons | B60H 1/00642 703/1 |
| 2005/0051133 | A1* | 3/2005 | Persson | F02D 11/105 123/396 |
| 2008/0074209 | A1* | 3/2008 | Ceylan | H03C 5/00 332/144 |
| 2009/0271154 | A1* | 10/2009 | Coad | G06F 17/5004 703/1 |
| 2013/0050511 | A1* | 2/2013 | Derby | G06Q 50/06 348/207.1 |
| 2014/0019319 | A1* | 1/2014 | Derby | G06Q 10/0639 705/30 |
| 2014/0142904 | A1* | 5/2014 | Drees | G06Q 10/04 703/2 |
| 2014/0359524 | A1* | 12/2014 | Sasaki | G06F 3/04817 715/781 |
| 2015/0032099 | A1* | 1/2015 | Larson | A61B 18/1233 606/35 |
| 2015/0286226 | A1* | 10/2015 | Fadell | G06Q 10/20 700/276 |
| 2016/0018835 | A1* | 1/2016 | Gaasch | G05F 1/66 700/291 |
| 2016/0211985 | A1* | 7/2016 | Castillo | G05B 15/02 |
| 2017/0046766 | A1* | 2/2017 | Rolles | G06Q 30/0627 |
| 2017/0123602 | A1* | 5/2017 | Jones-McFadden | G06F 3/0482 |
| 2018/0121571 | A1* | 5/2018 | Tiwari | G06Q 10/10 |

OTHER PUBLICATIONS

Mitsubishi Electric, "Residential System Builder," Jun. 25, 2017, https://web.archive.org/web/20170625041751/https://www.mitsubishicomfort.com/residential-system-builder.*

Huber, "She bought a new air-conditioning system, and now her house is filled with mildew," Oct. 29, 2018, https://www.washingtonpost.com/lifestyle/home/she-bought-a-new-air-conditioning-system-and-now-her-house-is-filled-with-mildew/2018/10/26/570a7c22-d612-11e8-83a2-d1c3da28d6b6_story.html.*

Home Comfort Advisor, "Why 'bigger' is not always 'better' when buying a Furnace or Air Conditioning unit," Jan. 11, 2018, https://www.homecomfortadvisor.com/what-is-the-wrong-size-furnace-or-ac-unit/.*

Tucker, "How to Determine Proper Furnace Size," Dec. 6, 2018, https://homeguides.sfgate.com/determine-proper-furnace-size-96417.html.*

Journal of Light Construction, "Incorrect furnace installed," Feb. 21, 2003, https://forums.jlconline.com/forums/forum/jlc-online-peer-to-peer-forums/business-strategies/12551-incorrect-furnace-installed.*

Air Conditioning Contractors of America, "Speed-Sheet for ACCA Manual J (Abridged Edition)," retrieved Nov. 29, 2019, https://www.acca.org/standards/communities/resources/viewdocument/?DocumentKey=0bc73e80-6c3c-43cb-bdb2-43316a380fa4.*

Air Conditioning Contractors of America, "Speed-Sheet for ACCA Manual S (Residential Equipment Selection)," retrieved Nov. 29, 2019, https://higherlogicdownload.s3.amazonaws.com/ACCA/c6b38bda-2e04-4f93-bd51-7a80525ad936/UploadedImages/SpeedSheets/Manual_S_2E-V1_00_06NOV19.xlsx.*

* cited by examiner

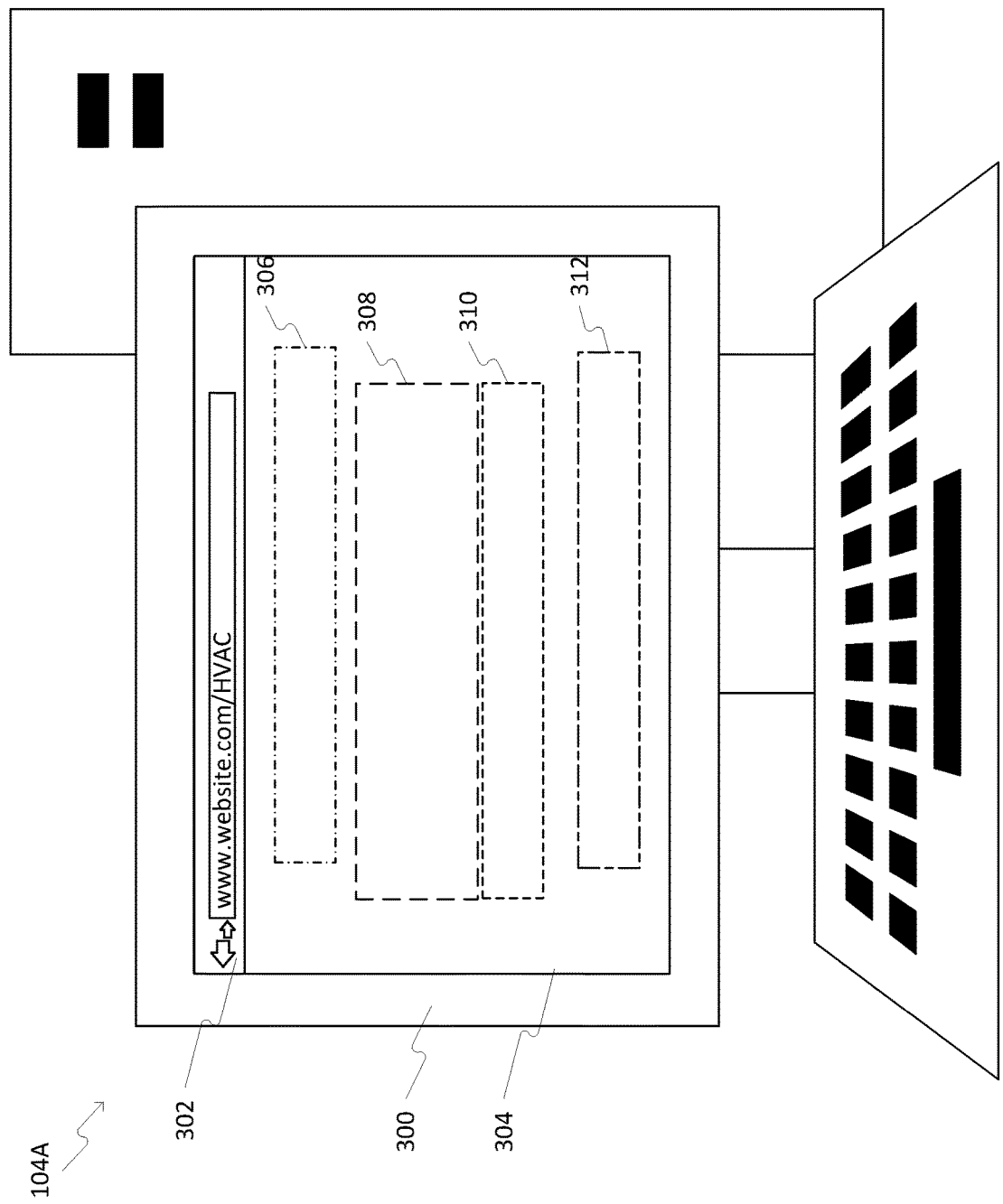

304

402 — 4. How Many Floors Does Your Home Have? Include The Basement
Answer: 2  — 306

404 — 5. How Do You Heat/Cool Your Home? — 308

310
A. Heat Pump (Electric)
B. Gas Furnace and AC (Natural Gas)
C. AC Only (Electric)
406

410 — 6. How Many Thermostats Does Your Home Have? — 312

Fig. 4A

SYSTEMS AND METHODS FOR AUTOMATICALLY DETERMINING SYSTEM SPECIFICATIONS FOR HVAC COMPONENTS

CROSS-REFERENCE TO RELATED APPLICATIONS

This application claims the benefit of priority to U.S. Provisional Patent Application No. 62/794,263, filed Jan. 18, 2019, which is expressly incorporated herein by reference in its entirety.

BACKGROUND

Technical Field

The present disclosure generally relates to computerized systems and methods for dynamically displaying a graphical user interface configured to request and receive information relating to one or more structures or areas to be serviced by an HVAC system, to automatically access data relating to the received information, to automatically determine one or more requirements of an HVAC system based on the received information and the accessed data, and to display one or more available HVAC systems having characteristics matching the determined requirements.

Background Information

A heating, ventilation, and air conditioning (HVAC) system is the primary means of controlling indoor air quality and temperature in most residential and commercial buildings. HVAC systems work by treating air, for example by heating or cooling it, and circulating the treated air throughout the structure. To effectively control the temperature and quality of the air, the HVAC system should be properly sized such that an adequate amount of air is treated and circulated at an adequate rate.

Sizing an HVAC system typically requires an inspection of the building by an HVAC technician. The technician collects data relating to the building (such as it dimensions and number of floors), the existing HVAC components (such as thermostats and vents), the power source for the HVAC system (such as whether it is electric or gas or a combination thereof), the customer's preferences, and so forth. The technician will then determine the minimum requirements needed for an HVAC system or components thereof. The technician will provide cost estimates for the HVAC system or components and may also serve as a salesman and sell the customer the HVAC components at the end of the inspection.

There are several potential challenges with traditional methods of determining the requirements of an HVAC system. For example, the customer may have to invite several technicians to inspect his or her home because the technicians are typically employed by a single HVAC manufacturer or retailer and only provide quotes or estimates related to their products. The customer may have no adequate means for comparing multiple HVAC systems manufactured or sold by other manufacturers and retailers. As another example, different technicians may come to different conclusions as to the requirements of the HVAC system. The technicians may also be incentivized by their role as salesman and may recommend that the customer purchase upgraded or extraneous HVAC components. The cost estimates are also delivered after the inspection so the customer has no means for knowing whether the technician will offer a reasonable or competitive price until setting aside the time for the inspection. These and other factors lead to inconsistent and inefficient HVAC sizing.

There is, therefore, a need for improved methods and systems for automatically determining the requirements of one or more HVAC components.

SUMMARY

Embodiments consistent with the present disclosure provide systems, methods, and devices for automatically determining system specification for one or more HVAC components.

Consistent with disclosed embodiments, a method for automatically determining system specifications for one or more HVAC components is disclosed. The method may include presenting a processor-generated graphical user interface (GUI) for one or more portions of the method. The method may include requesting information relating to a building where one or more HVAC components are to be installed. The information may be requested through the GUI. The method may further include receiving one or more identifiers associated with the building. The one or more identifiers may be received form a user via an input field associated with the GUI. The method may include accessing a database and using the one or more identifiers to automatically determine at least one characteristic associated with the building. The method may further include determining the system specifications for the one or more HVAC components based, at least in part, on the at least one characteristic. The method may further include displaying the determined system specifications for the one or more HVAC components. The determined system specifications may be displayed on the GUI.

Consistent with disclosed embodiments, a system for automatically determining system specifications for one or more components of an HVAC system using a processor-generated GUI is disclosed. The system may include at least one processor. The at least one processor may be programmed to generate the GUI. The at least one processor may be further programmed to present the GUI to a user via a display and request, through the GUI, information relating to a building where one or more HVAC components are to be installed. The at least one processor may be further programmed to receive one or more identifiers associated with the building. The at least one processor may receive the one or more identifiers form a user via an input field associated with the GUI. The at least one processor may be further programmed to access a database and use the one or more identifiers to automatically determine at least one characteristic associated with the building. The at least one processor may be further programmed to determine the system specifications for one or more HVAC components based, at least in part, on the at least one characteristic. The at least one processor may be further configured to display the determined specifications for the one or more HVAC components. The at least one processor may display the determined specifications on the GUI.

Consistent with other disclosed embodiments, non-transitory computer-readable storage media may store program instructions, which are executed by at least one processing device and perform any of the methods described herein.

The foregoing general description and the following detailed description are exemplary only and are not restrictive of the claims.

BRIEF DESCRIPTION OF DRAWING(S)

The accompanying drawings, which are incorporated in and constitute a part of this disclosure, illustrate various disclosed embodiments.

FIG. 3 is an illustration of an exemplary GUI on a user device consistent with this disclosure.

FIG. 4A is an illustration of an exemplary configuration of a GUI consistent with this disclosure.

DETAILED DESCRIPTION

Figure 1:
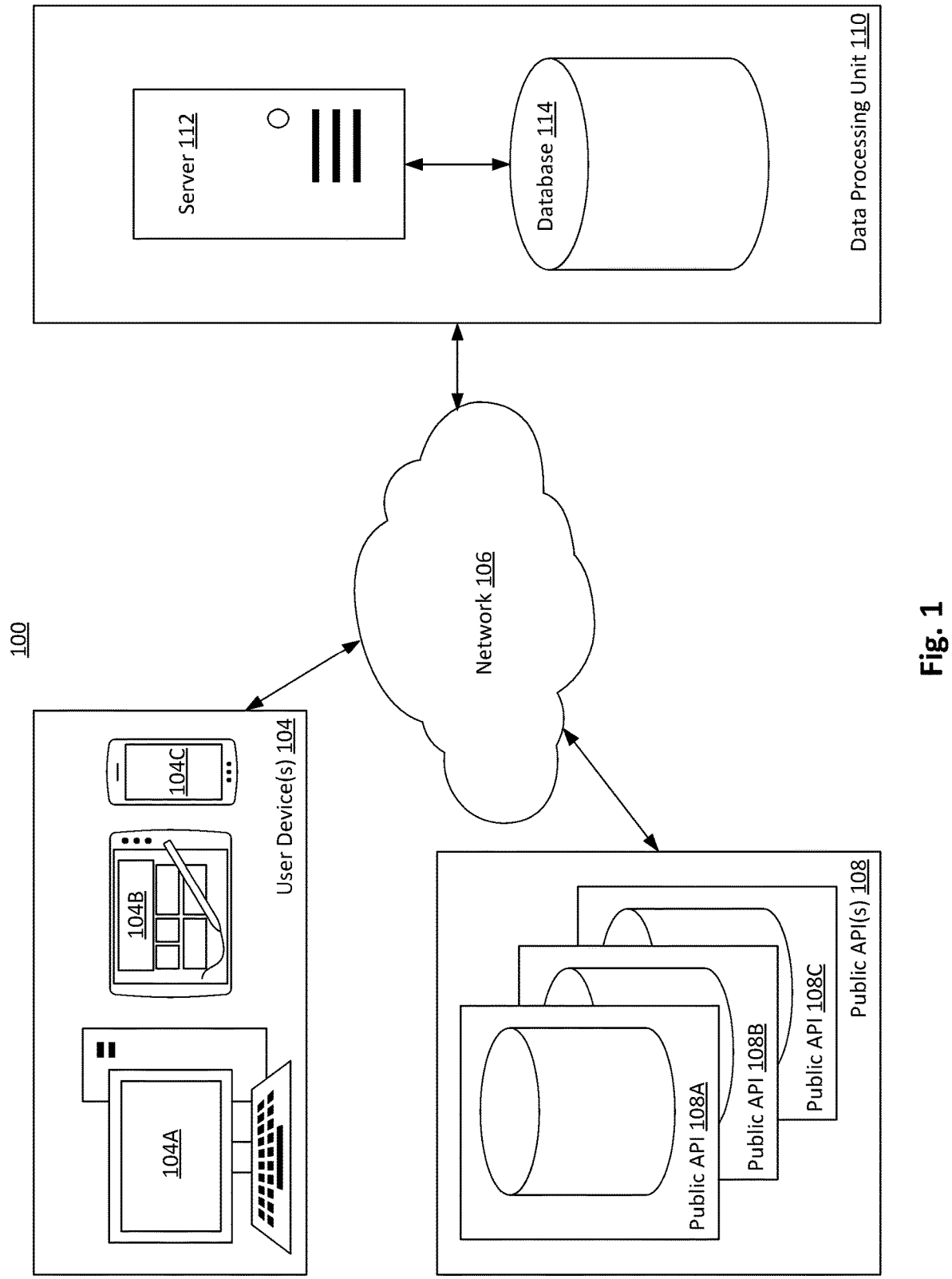
FIG. 1 is an illustration of an exemplary system for automatically determining system specifications for one or more HVAC components consistent with this disclosure.

The following detailed description refers to the accompanying drawings. Wherever possible, the same reference numbers are used in the drawings and the following description to refer to the same or similar parts. While several illustrative embodiments are described herein, modifications to, adaptations of, and other implementations of the embodiments are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. The proper scope of the invention is defined by the appended claims.

The disclosed systems and methods relate to a user interface, provided by specialized programming, for automatically determining HVAC equipment sizing for a particular location (e.g., a user's home, office, etc.) and for automatically generating cost estimate information. The cost estimate information may be generated based, in part, on information provided to the system by a user and based, in part, on information automatically retrieved or determined based on information provided by the user. The user interface may operate on mobile or desktop platforms and may display to the user the appropriate equipment and cost estimates. The user interface may display a plurality of appropriate equipment options and a plurality of cost estimates, each cost estimate corresponding with one of the plurality of appropriate equipment options.

The user interface may be configured to request information through a series of questions. The requested information may relate to a user's home (or other structure in need of an HVAC system) including the address, number of floors, number of thermostats, the energy source or sources for the HVAC system, and other information relevant to sizing an HVAC system. The system may use the information to determine or access additional information relating to the home, such as the square footage or climate associated with the home. The combination of the requested information and the determined or accessed information may then be used to determine the size requirements of one or more components of an HVAC system.

As used herein, the term "system specification" or "specification" refers to one or more characteristics, features, or requirements of an HVAC system or component and is to be construed broadly. For example, a specification may include a physical size of an HVAC component or a capacity (such as a flow rate) of an HVAC component. Throughout this disclosure, the term "HVAC requirement," and derivatives thereof, may be used interchangeably with "system specification" or "specification."

Consistent with the present disclosure, specifications for HVAC components or systems may be determined by a system for automatically determining system specifications for one or more components of an HVAC system using a processor-generated graphical user interface (GUI). FIG. 1 is an illustrative schematic of a system 100 configured to automatically determine the specifications of an HVAC system consistent with this disclosure. In some embodiments, system 100 may represent a computer-based system that includes computer system components, desktop computers, workstations, tablets, handheld computing devices, smartphones, memory devices, and/internal networks connecting the components. System 100 may include or be connected to various network computing resources (e.g., servers, routers, switches, network connections, storage devices, etc.) necessary to support the services provided by system 100. In some embodiments, system 100 enables estimation of HVAC systems requirements and requirements of components thereof based on information received from user devices 104. In some embodiments, system 100 may communicate with a user, for example through one or more user devices 104, to collect data relating to a building in which an HVAC system is to be installed. In some embodiments, system 100 may provide data collected from a user to a public API, such as public API 108A, 108B, or 108C, to access and collect data from the public API. The data may be transmitted through a network 106. In some embodiments, system 100 enables determination of HVAC system specifications and specifications of components thereof based on information accessed from one or more public APIs 108.

Network 106 may be any type of network that provides communication, exchanges information, and/or facilitates the exchange of information between the components of system 100. For example, network 106 may include or be part of the Internet, a Local Area Network, a wireless network (e.g., a WiFi network), or any other suitable connections. In some embodiments, one or more components of system 100 may communicate with one or more other components of system 100 directly through dedicated communication links, such as, for example, a telephone network, an extranet, an intranet, satellite communications, off-line communications, wireless communications, transponder communications, a virtual private network (VPN), or any other dedicated communications link.

System 100 may include one or more public APIs 108, such as public API 108A, 108B, or 108C. Public APIs 108 may include any API that is open to the public and contains information relevant to the determination of a requirement of an HVAC system. For example, multiple public APIs 108 may contain data relating to the square footage, number of floors, efficiency upgrades, or other features of a building. As another example, multiple public APIs 108 may contain data relating to the geographic location in which the building is located, such as the climate, local energy regulations, and the like. Each public API 108 may contain a system, network, database, memory, combination thereof, or the like. Examples of public APIs that may be accessed by system 100 include Zillow or other home-buying resources, Google Maps, Apple Maps, or other location-based resources, HVAC manufacturer or retailer APIs, and so forth.

In some embodiments, system 100 may access one or more public APIs 108 in response to a determination that information needed to determine a specification of an HVAC system is not included in the data provided by a user through, for example, user devices 104. For example, a user may provide information relating to a location and configuration of a building, but may not provide information related to the square footage of the building. In response, system 100 may access one or more public APIs 104 to determine the square footage of the building. In some embodiments, system 100 may access one or more public APIs 104 to gather data needed to determine the specifications of an HVAC system and then use user input from user devices 104 to provide any data not available on public APIs 104. For example, a user may request an HVAC system cost estimate for a building and, in response, system 100 may access one or more public APIs 108 to determine the climate relevant to the building, a square footage, and/or a number of floors in the building. In some cases, system 100 may not be able to determine the number of thermostats in the building via the public APIs. In such cases, system 100 may request, through the GUI on user devices 104, information related to the number of thermostats in the building. In some embodiments, system 100 may access one or more public APIs 108 on a regular basis and store the information, for example, in database 114 or another memory device. For example, every week, month, or year, system 100 may access a public API 104 containing local regulations relating to HVAC requirements and store that information in database 114 for use at a later time when a user requests a cost estimation or determination of an HVAC requirement as disclosed herein.

System 100 may include a data processing unit 110 for processing the data collected from user devices 104 and/or from public APIs 108. The data may be transmitted to data processing unit 110 via network 106. Data processing unit 110 may include a server 112 and a database 114, server 112 being operatively connected to database 114. Additionally or alternatively, data processing unit 110 may include one or more servers connected by a network, such as network 106 or another network. Consistent with this disclosure, data processing unit 110 may receive raw or processed data from user devices 104, public APIs 108, or a combination thereof, and may process the data according to the present disclosure.

In some embodiments, server 112 and database 114 may be housed on the same computing device or on difference computing devices. In some embodiments server 112 may include a cloud server that processes data received from the user devices 104 and/or public APIs 108. The term "cloud server" refers to a computer platform that provides services via a network, for example the Internet. In this example, server 112 may use one or more virtual machines that do not correspond with individual hardware. For example, computational or other capabilities may be implemented by allocating portions of the capabilities from a scalable repository, such as a data center or a distributed computing environment. In some embodiments, server 112 may be configured as a special-purpose machine, configured with one or more hard-wired logics, applications, or programs to perform the processes and methods disclosed herein.

Server 112 may be coupled to one or more physical or virtual storage devices, such as database 114. Server 112 may access database 114 to determine a size requirement of an HVAC system; the determination may occur based on a comparison of the processed data with data stored on database 114 associated with an HVAC component or system requirement. Database 114 may be included on a volatile, non-volatile, magnetic, semiconductor, tape, optical, removable, non-removable, or other type of storage device or tangible or non-transitory computer-readable medium. It is contemplated that database 114 may be part of server 112 or separate from but in communication with server 112. Database 114 may include one or more memory devices that store data or instructions used to perform one or more features or functions of the disclosed embodiments. In some embodiments, database 114 may include one or more suitable databases, ranging from small databases hosted on a workstation to large databases distributed among data centers. Database 114 may also include any combination of one or more databases controlled by memory controller devices (e.g., server(s), etc.) or software. For example, database 114 may include document management systems, Microsoft SQL databases, SharePoint databases, Oracle™ databases, Sybase™ databases, other relational databases, or non-relational databases, such as mongo and others.

In some embodiments, user devices 104 may be configured to display a graphical user interface (GUI) consistent with the present disclosure. User devices 104 may include computers (such as user device 104A), tablets (such as user device 104B), smartphones (such as user device 104C), or any other device capable of displaying the GUI and receiving user input. It is contemplated that each user device 104 may include an application consistent with the present disclosure. The application may be configured to display the GUI on each device 104 and to adjust the GUI as needed to fit the needs of the device. For example, data processing unit 110 may generate instructions for displaying the GUI on user device 104 and the application on user device 104 may transform the instructions such that the GUI is displayed in a manner that meets the limitations (e.g., screen-size, input modality, etc.) of each user device 104. As discussed further below, the GUI may be configured to display prompts requesting particular information from a user and to display the final HVAC requirements and cost estimation determined by data processing unit 110.

The components and arrangements shown in FIG. 1 are not intended to limit the disclosed embodiments, as the system components used to implement the disclosed processes and features may vary. In some embodiments, system 100 may include several servers 112, and each server 112 may host a certain type of service. For example, a first server may process data received from user devices 104 and determine what data is required from public APIs 108, and a second server may access one or more public APIs 108 to retrieve the required data, and a third server may process the data received from user devices 104 and retrieved from public APIs 108 to determine one or more HVAC component requirements. In another example, a first server may determine HVAC requirements for a first geographic are having a first climate, a second server may determine HVAC requirements for a second geographic are having a second climate different from that of the first geographic area, and so forth. The examples are not limiting, and server 112 may include any number of servers configured to perform any portion of the disclosed features, methods, and processes.

Figure 2:
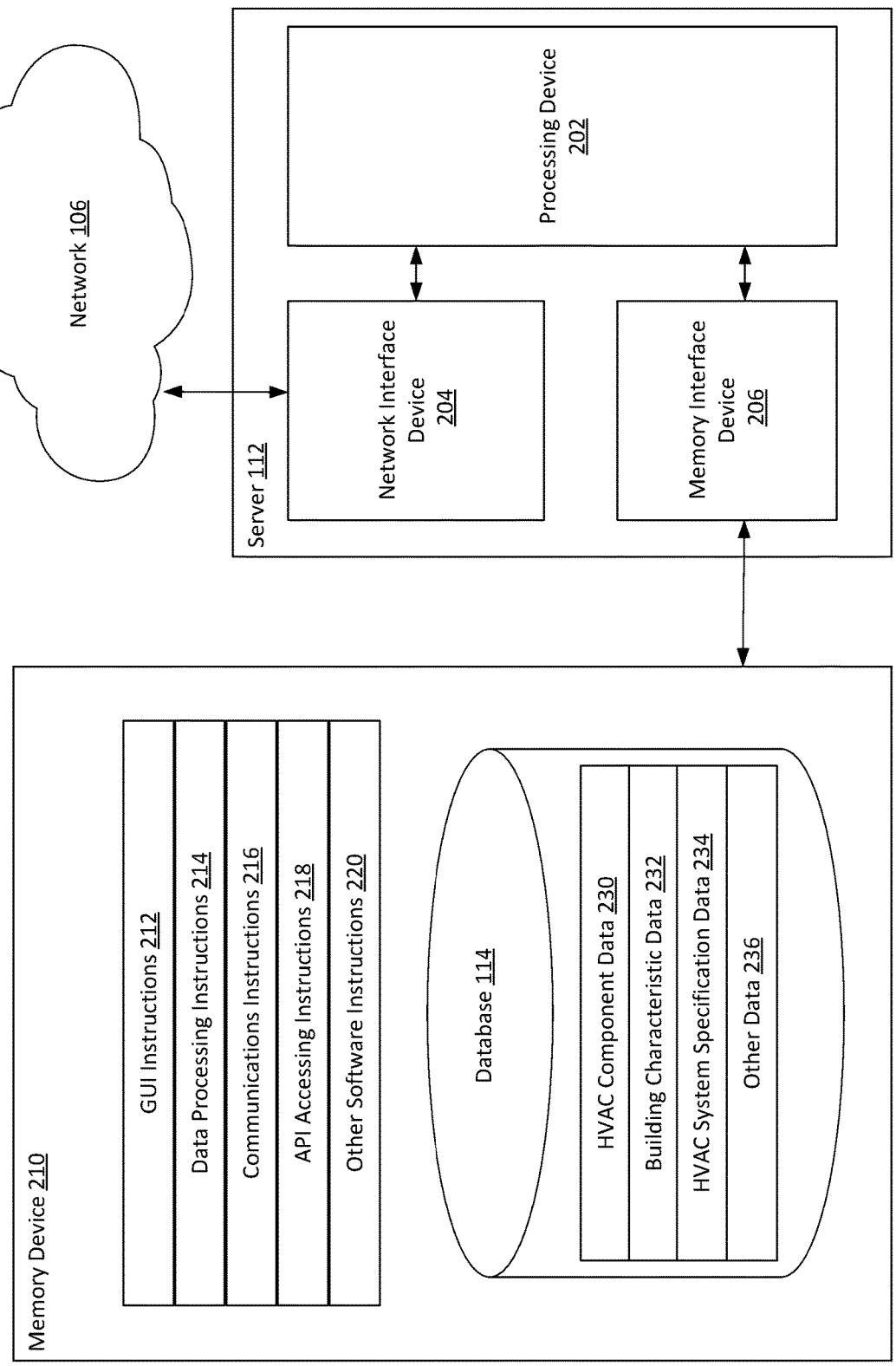
FIG. 2 is a block diagram that illustrates some of the components of a data processing unit consistent with this disclosure.

FIG. 2 is a block diagram representation of an exemplary configuration of server 112 and database 114. In one embodiment, server 112 includes a processing device 202 or any other processor, a network interface device 204 or other means for receiving or accessing data over network 106, and a memory interface device 206 or other means for accessing a memory. In some embodiments, sever 112 may include additional features, such as a bus or other communication mechanism to interconnect one or more subsystems within server 112 or an I/O system. In some embodiments, server 112 may include just processing device 202 or similar processor.

Processing device 202 may include one or more processors configured to include computer programs, applications, methods, processes, or other software to execute particular instructions associated with embodiments described in the present disclosure. The term "processing device" refers to any physical device having one or more electric circuits to perform logic operations. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include a single core or multiple core processor capable of executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with this disclosure, the methods, processes, and operations disclosed herein may be performed by processing device 202 to execute one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 112, or at a remote location. Additionally, one or more computer-readable storage medi-ums can be utilized in implementing a computer-implemented method. The term "computer-readable storage medium" should be understood to include tangible items and exclude carrier waves and transient signals.

Server 112 may include network interface device 204 or any other communications interface. Network interface device 204 may provide two-way communication to a network, such as network 106. Network interface device 204 may take any form. For example, network interface device 204 may include a local area network (LAN) card to provide a data communication connection to a compatible LAN. As another example, network interface device 204 may include an Ethernet port connected to radio frequency receivers and transmitters and/or optical (e.g., infrared) receivers and transmitters. As another example, network interface device 204 may be configured to send and receive electrical, electromagnetic, or optical signals that carry digital data streams representing various types of information.

Network interface device 204 may be used to provide data to processing device 202. For example, a user may provide one or more inputs to user device 104 and the input may be provided to processing device 202 over network 106 through network interface device 204. Network interface device 204 may be used to transmit data or instructions from processing device 202 over network 106. For example, processing device 202 may generate instructions for displaying a GUI and may transmit those instructions to user devices 104 over network 106 using network interface device 204. Network interface device 204 may be used to access data or instructions over network 106. For example, processing device 202 may access public APIs 108 over network 106 using network interface device 204.

Memory interface device 206 may be used to access data and software products stored on a memory device, for example memory device 210. Memory device 210 may store GUI instructions 212 to facilitate the generation of one or more GUIs; data processing instructions 214 to facilitate data processing related operations and functions; communication instructions 216 to facilitate communicating with one or more devices (e.g., user devices 104); API accessing instructions 218 to facilitate public API accessing operations and processes related thereto; and other software instructions 220 to facilitate other processes and functions. Each of the above identified instructions and applications may correspond to a set of instructions for performing one or more functions described above. These instructions need not be implemented as separate software programs, procedures, or modules. Memory device 210 may include additional instructions or fewer instructions. Each of the above identified instructions and applications may be implemented in hardware and/or software, including in one or more signal processing and/or application specific integrated circuits.

In some embodiments, each of the above identified instructions may include programming expressed in any suitable coding language (e.g., Json, PHP, Javascript, etc.) or technique. In some embodiments, the instructions may not be distinctly separated, rather the instructions may be embodied in inter-related programming.

For example, API accessing instructions 218 may include instructions for accessing a public API (such as public API 108A) and determining a square footage, a number of thermostats, and/or a number of floors associated with a building based on an address of the building, among other things. For example, the instructions may include code for determining the square footage comprising:

```
function getSquareFt(endpointUrl) {
    return fetch(endpointUrl)
        .then(results=>result.json( ))
        .then(function (data) {
            if (data && data["SearchResults:searchresults"]
                .message.code==0) {
                const    mutlitpleResults=Array.isArray(data
                    ["SearchResults:searchresults"]
                    .response.results.result);
                if (multipleResults) {
                    let indexOfLast=data["SearchResults:searchre-
                        sults"].response.results.length-1;
                    return    data["SearchReults:searchresults"].re-
                        sponse.results.result[index    OfLast].finished-
                        SqFt;}
                    else    {return data["SearchResults:searchre-
                        sults"].repsonse.results.results.finishedSdFt;}
            }
        })
};
```

In this example, data processing instructions 214 may include instructions for determining an HVAC system specification based on the square footage and a number of thermostats in the building. For example, the instructions may include code comprising:

```
function getRecommendedSystemSize(sqft, floors, ther-
    mostats) {
    switch(floors) {
        case 4:
            sqft=(sqft*0.75)/thermostats;
            break;
        case 3:
            sqft=(sqft*0.66)/thermostats;
            break;
        case 2:
            sqft=(sqft*0.50)/thermostats;
            break;
        default:
            sqft=sqft/thermostats;
            break;
    }
    if (sqft>=600 && sqft<=800) {
        return "1.5 Ton";
    } else if (sqft>=801 && sqft<=1200) {
        return "2 Ton";
    } else if (sqft>=1201 && sqft<=1400) {
        return "2.5 Ton";
    } else if (sqft>=1401 && sqft<=1800) {
        return "3 Ton";
    else if (sqft>=1801 && sqft<=2250) {
        return "3.5 Ton";
    } else if (sqft>=2251 && sqft<=2600) {
        return "4 Ton";
    } else if (sqft>=2601 && sqft<=3200) {
        return "5 Ton";
    } else {
        return "No Results";
    }
    }
})( );
});
```

The code provided for the above examples is not limiting and any code or other means for performing the methods, operations, and processes disclosed herein may be included in the instructions stored on memory device 210. Additional examples of programming consistent with this disclosure are provided in the provisional application to which this application claims priority and which is incorporated herein in its entirety.

In some embodiments, memory device 210 may store database 114. Database 114 may include HVAC component data 230, building characteristic data 232, HVAC system specification data 234, and/or other data 236. Other data 236 may include any data or information consistent with this disclosure. In other embodiments of the disclosure, database 114 may store additional types of data or fewer types of data. Furthermore, various types of data may be stored in one or more memory devices other than memory device 210.

HVAC component data 230 may include information related to one or more HVAC components. For example, HVAC component data 230 may include a price, size, technical description, performance capabilities, performance specifications, or other data relating to an HVAC component. As another example, HVAC component data 230 may include a list of one or more HVAC components that are typically needed for an HVAC system. In some embodiments, the data stored in HVAC component data 230 may be stored on another memory device different from memory device 210. For example, HVAC component data 230 may be stored on a database maintained by a public API provider, and processing device 202 may access it through network interface device 204 as described above. HVAC component data 230 may include any other data consistent with this disclosure.

Building characteristic data 232 may include any information relating to a building or group of buildings. For example, building characteristic data 232 may include one or more energy regulations that apply to a group of buildings, such as a city ordinance that requires particular energy standards. Building characteristic data 232 may include a list of characteristics and/or identifiers that are needed to perform one or more processes, methods, or operations consistent with this disclosure. As a non-limiting example, building characteristic data 232 may provide that an address, a number of floors, and a number of thermostats are required to automatically determine system specifications for one or more HVAC components. Building characteristic data 232 may include any other data consistent with this disclosure.

HVAC system specification data 234 may include information relating to one or more system specifications and/or information needed to determine one or more system specifications. For example, HVAC system specification data 234 may include information relating to how system specifications change depending upon the climate associated with the building, the square footage associated with the building, the number of floors in the building, or any other factor. For example, HVAC system specification data 234 may store the information included in Table 1 and/or Table 2, discussed below. HVAC system specification data 234 may include any other data consistent with this disclosure.

Each of the above identified categories of data may include data that is provided by a user (for example, when setting up system 100), determined by a processor (for example, data determined by processing device 202 at a first time may be stored and used at a later time), pulled from an external source (for example, processing device may access data on public APIs 108 and store the data in database 114), a combination thereof or the like. In some embodiments, processing device 202 may be configured to routinely update the data stored in database 114. For example, on a periodic basis, processing device 202 may request data from a user or may access public API 108 to update the data stored on database 114.

Consistent with the present disclosure, the system for automatically determining system specifications for one or more components of an HVAC system may include at least one processor. For example, the processor may include processing device 202, one or more processors included in user device 104, one or more processors included in public APIs 108, or another processor in communication with network 106. In some embodiments, one or more processors may be specially programmed to automatically determine one or more HVAC system specifications. In some embodiments, one or more processors may be configured to automatically determine one or more HVAC system specifications in response to instructions stored on a memory or database in communication with the one or more processors.

Consistent with this disclosure, the processor may be programmed to generate a GUI. The GUI may be any generated by any means disclosed herein. For example, the processor may access GUI instructions 212 and cause user device 140 to display a GUI by transmitting instructions to user device consistent with GUI instructions 212.

FIG. 3 is an exemplary illustration of a graphical user interface 304 consistent with the present disclosure. The GUI is shown displayed on a display of a monitor 300 of a computer-type user device 104A, but it may be displayed on any user device 104. In the example depicted in FIG. 3, GUI 304 may be accessed through a network, for example the Internet. The GUI may include elements associated with accessing or navigating through a network connection. For example, GUI 304 may include a navigation bar 302, which may contain navigation tools associated with Internet browsing.

Consistent with the present disclosure, GUI 304 may be configured to request and receive information. The information may be associated with a building in which an HVAC system is to be installed, with known HVAC requirements, and so forth. For example, the information requested and received may include one or more identifiers associated with a building (e.g., associated with a building in which the HVAC system is to be installed). The identifiers may include, for example, an address associated with the building, a number of pre-existing thermostats or other HVAC controls in the building, a number of floors within the building, an indicator of the power source for the HVAC system or components, and the like. The characteristics may also include, for example, a square footage of the building, a climate associated with the geographical location associated with the building, and the like.

Figure 4B:
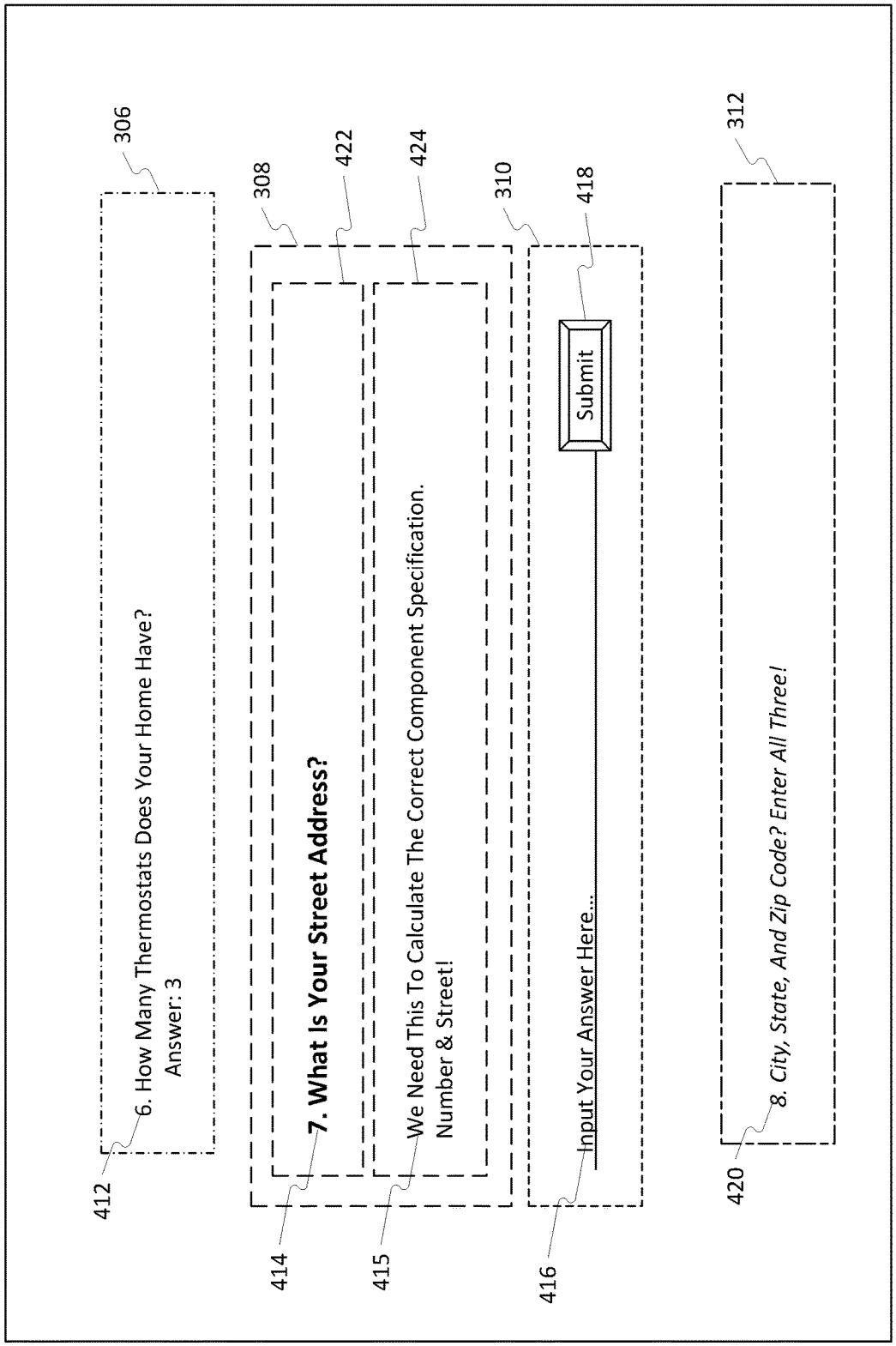
FIG. 4B is an illustration of an exemplary configuration of a GUI consistent with this disclosure.

Consistent with the present disclosure, GUI 304 may include a prompt window 308. Prompt window 308 may be the most prominently displayed aspect of GUI 304. For example, prompt window 308 may be the largest window within GUI 304. In some embodiments, as in FIG. 3, prompt window 308 may be displayed substantially in the center of GUI 308. In other embodiments, prompt window 308 may be displayed in a position where the user would naturally view it first. For example, when configured for an English-speaking audience, GUI 304 may display prompt window 308 in the upper left corner of a display, as English speakers may have a tendency to read from top to bottom and from left to right. In some embodiments, prompt window 308 may include a border, a color, an indicator, or other feature that makes it appear more prominently than other windows on GUI 304. For example, as shown in FIG. 4A and FIG. 4B, the content of prompt window 308 may be displayed in bold. In other examples, the content of prompt window 308 may be displayed in a different color, size, font, or the like than content displayed in other aspects of GUI 304. In another example, the background color of prompt window 308 may be lighter or darker than the background color of the remainder of GUI 304, thereby making prompt window 308 stand out from the remainder of GUI 304.

Prompt window 308 may be configured to display a request for information from a user of user device 104. The request may include, for example, a question relating to an identifier associated with the building or a characteristic of the building. For example, if the identifier to be used in determining an HVAC component specification is the number of pre-existing thermostats in the building, the request may include a question such as, "how many thermostats or control units are present in your home?" The request may additionally or alternatively include a prompt that is not a question. For example, the request may be formatted as a full or partial statement, an exclamation, or any other format. Continuing the thermostat example, the request may include a partial statement such as, "my home contains _____ thermostats." The request may be displayed in textual or other visual form. For example, the request may include symbols, emojis, or other non-textual indicators. The request may additionally or alternatively include audible prompts. The examples above are exemplary only and are not limiting. Additional possible requests are discussed in relation to FIG. 4A and FIG. 4B.

Consistent with this disclosure, prompt window 308 may be configured to display a series of prompts or request. For example, a first request may be displayed in prompt window 308 at a first time and a second request may be displayed in prompt window 308 at a second time, the second request being displayed after an input responsive to the first request is received from a user. Each subsequent prompt may be predetermined or may be determined based on the input received from a user. For example, a first prompt may request an address from a user. If the user provides the response "123 D. St. NW," a second request may seek the city, state, and zip code associated with the address. Conversely, if the user provides, in response to the first request, "123 D. St. NW, Washington D.C., 20003," a second request seeking the city, state, and zip code would not be needed. Examples of the types of request displayed in prompt window 308 are discussed throughout this disclosure.

In some embodiments, prompt window 308 may include an informational or explanatory statement relating to a request. The informational or explanatory statement may be displayed in association with the request (e.g., in close proximity to the request). For example, in the example above, the request "my home contains _____ thermostats" may be displayed with an explanatory statement instructing the user to enter a number in the blank, such as the statement "please fill in the blank with an appropriate number." Other examples of informational or explanatory statements may include statements providing a reason for the request, statements describing the type of input that would be considered responsive to the request, statements providing instructions to a user, or other statements that may facilitate proper responses to the request displayed in prompt window 308. It is contemplated that prompt window 308 may include one or more regions and that each region may display one or more requests, informational or explanatory statements, or a combination thereof. An example of GUI 304 with a prompt window 308 containing two regions is discussed with relation to FIG. 4B.

Consistent with the present disclosure, GUI 304 may include an input window 310. Input window 310 may be displayed on GUI 304 in a position that indicates a relationship to prompt window 308. For example, as shown in FIG.

3, input window 310 may be displayed below prompt window 308 and in close proximity to prompt window 310. In another example, input window 310 may be displayed next to prompt window 308 and may be of substantially the same size as prompt window 308. It is contemplated that input window 310 is the second most prominently displayed aspect of GUI 304, with prompt window 308 being the most prominently displayed aspect, as described above. In some examples, the content in input window 310 may be displayed substantially similar to the content in prompt window 308. In other examples, the content in input window 310 may be similar to but slightly less prominent than the content of prompt window 308. For example, if prompt window 310 contains bold, 16-point font, that is white in color, input window 308 may contain bold, 14-point font, that is grey in color. The examples of the display of prompt window 310 are exemplary only.

Input window 310 may be configured to receive information from a user. The input may be responsive to the request or other display in prompt window 308. For example, the user may perceive the request displayed in prompt window 308 and may input information in input window 310. In embodiments where prompt window 308 is configured to display a series of requests, input window 310 may be configured to display a series of input fields corresponding with the series of requests. In some embodiments, input window 310 may be configured to only accept input that corresponds with the request displayed in prompt window 308. For example, if the request in prompt window 308 is seeking a number (e.g., a number of floors in a building, a number of thermostats, etc.) input window 310 may be configured such that it will accept an input representing a number but will reject input that is not a number. In this example, a responsive input may include a numerical input (e.g., "5"), a textual input of a number (e.g., "five"), a phrase including a numerical or textual number (e.g., "my home has 5 floors" or "my home has five floors"), and the like. As described above, an informational or explanatory statement displayed in prompt window 308 may instruct a user of the type of input that will be accepted in input window 310. It is contemplated that if a user provides an input that is not responsive to a request displayed in prompt window 308, an error message may be displayed. The error message may be displayed in either prompt window 308, input window 310, or as a pop-up window within GUI 304. The error message may include additional information instructing the user to provide an input that may be received in input window 310.

Input window 310 may include any means for receiving information from a user. For example, input window 310 may include a text box, one or more virtual buttons, a predetermined list of responses, virtual controls for recording audible input, or any combination thereof. Likewise, input window 310 may be configured to receive any type of input including textual input, audible input, selective or binary input, or the like. FIG. 4A and FIG. 4B provide examples of different configurations of input window 310 and are discussed further below. The examples are not limiting.

Consistent with this disclosure, GUI 304 may include a prior response window 306. Prior response window 306 may be displayed such that it is not as prominently displayed as prompt window 308 or input window 310. For example, prior response window 306 may be displayed in a position less likely to capture the user's attention, may be displayed in a size smaller than that of prompt window 308 or input window 310, or the like. The content within prior response window 306 may be displayed in a smaller font, a more subdued color, or otherwise in a manner that makes it less visible to a user. For example, in FIG. 3, prior response window 306 is displayed above prompt window 308 and is substantially smaller than prompt window 308. In other embodiments, prior response window 306 may be displayed below input window 310 or to the left or right of prompt window 308, input window 310, or both.

Prior response window 306 may include content that was previously displayed in prompt window 308 or that was received through input window 310 or a combination thereof. For example, at a first time, a first request may be displayed in prompt window 308 and a user may input information responsive to the request in input window 310. In response to receiving the input, GUI 304 may be configured to move the first request, the input, or both to prior response window 306 and display a second or subsequent request in prompt window 308. As a specific example, the first request may include the request "please provide your street address" and the user may provide the input "2215 N. Sycamore Street" through input window 310. Thereafter, prior response window 306 may display the request and input (e.g., "please provide your street address. 2215 N. Sycamore Street."). It is also contemplated that prior response window 306 may display the input alone (e.g., "2215 N. Sycamore Street"), the first response alone (e.g., "please provide your street address"), a modified version of both or either (e.g., "Street Address: 2215 N. Sycamore St."), at least a portion of the request and an indication that a responsive input has been received (e.g., "Street Address: Received"), or the like. Continuing the example, a second request may then be displayed in prompt window 308 as the first request (or a version thereof) is displayed in prior response window 306. For example, as prior response window displays "Street Address: 2215 N. Sycamore St.," prompt window 308 may display a second request such as "please provide the city, state, and zip code associated with the street address" and input window 310 may be configured to receive an input responsive to the second request. This process may be repeated until there are no additional requests (i.e., all information has been received from a user). Prior response window 306 may include all previous responses or may include a subset of the previous responses (e.g., just the most recent previous response provided by a user).

In some embodiments, prior response window 306 may display general information relating to the prompt window 308 or the series of request that will be displayed therein. For example, prior response window 306 may display a welcome message that greets a user who is preparing to provide information in response to a prompt displayed in prompt window 308. In some embodiments, prior response window 306 may display welcoming information when GUI 304 is initially displayed and may display prior responses, as described above, as a user provides information and proceeds through a series of requests displayed in prompt window 308. In some embodiments, prior response window 306 may be configured to display an indicator of how may requests have been answered, how many requests remain, or a combination thereof. For example, if prompt window 308 is configured to display a series of 12 requests, prior response window 306 may include an indication of how many of the questions have been answered (e.g. "4/12," "4 of 12 Questions Completed," etc.) or a percentage of questions completed (e.g., "33% Done!," etc.). It is contemplated that the indicator of completion may be displayed alone or with a prior response, as described above. In some embodiments, prior response window 306 may include a plurality of regions and each region may be configured to display different content. For example, a first region may display a prior response and a second region may display an indicator of completion.

Consistent with this disclosure, and as shown in FIGS. 4A and 4B, GUI 304 may include a preview window 312. Preview window 312 may be displayed in a manner that indicates that it contains forthcoming information or prompts. For example, as in FIG. 3, preview window 312 may be displayed below input window 310. In other embodiments, preview window 310 may be displayed to the right of input window 310, to the right of prompt window 308, or both. In some embodiments, preview window 312 may be displayed on the opposite side of prompt window 308 and/or input window 310 as prior response window 306. It is contemplated that content displayed in preview window 312 at a first time will subsequently be displayed in prompt window 308 and subsequently displayed in prior response window 306. Specific examples of this content movement are discussed with relation to FIG. 4A and FIG. 4B. It is contemplated that preview window 312 may be of substantially the same size as prior response window 312. Likewise, preview window 312 may be displayed at a similar level of prominence as discussed with respect to prior response window 306.

Preview window 312 may display content comprising a request or similar information. The request or information may include any described herein, including those described with respect to prompt window 308. Unlike the request or information displayed in prompt window 308, however, the prompts displayed in preview window 312 are not accompanied by means for receiving an input responsive to the request (such as input window 310). Rather, the request or information displayed as a means for providing a user of GUI 304 with a preview of the request or information that the user will be asked to respond to after responding to the request displayed in prompt window 308. For example, the request "provide your street address" may be displayed in prompt window 308, and input window 310 may be configured to receive an input corresponding with a street address. At the same time, the request "provide the city, state, and zip code associated with your street address" may be displayed in preview window 312. Displaying the second request in preview window 312 provides the advantage of alerting the user of the type of request that will be upcoming and may allow the user to determine how to answer the request displayed in prompt window 308. Other examples are discussed further with respect to FIG. 4A and FIG. 4B.

Consistent with this disclosure, it is contemplated that preview window 312 may additionally or alternatively display an indicator of completeness. The indicator may be substantially the same as that described above. For example, preview window 312 may display the completeness indicator comprising: "3 of 10 questions completed," "only two questions left!", "70% done," and the like. Preview window 312 may include one or more regions, each region being configured to display different content. For example, a first region may display an upcoming request, as discussed above, and a second region may display an indicator of completeness.

The configuration of GUI 304 described above is exemplary only. It is understood that GUI 304 may be configured in any configuration that facilitates the display of one or more request related to an HVAC system, a building in which an HVAC system is to be installed or repaired, and other information related to automatically determining one or more specifications for an HVAC system or component and facilitates the input of information responsive to the one or more requests.

FIG. 4A and FIG. 4B are exemplary embodiments of GUI 304. It is understood that the examples in FIG. 4A and FIG. 4B may be displayed on any user device, including user devices 104A, 104B, 104C. The dimensions and placement of the various GUI aspects may be adjusted to fit the size and dimension of a display on a device. For example, GUI 304 may be displayed substantially as shown in FIG. 4A and/or FIG. 4B when the user device is a computer (e.g., 104A), but may be displayed in a significantly different manner when the user device is a cellular phone or other mobile computing device (e.g., user device 104C). The embodiments disclosed herein are exemplary only and those in the art would understand how they may be adjusted to be compatible with the display of any user device 104.

FIG. 4A and FIG. 4B are related in the sense that they depict the same GUI 304 at different points in time. The differences between FIG. 4A and FIG. 4B represent how GUI 304 changes its configuration as a series of prompts are displayed in prompt area 308 and a series of responses are received from a user through one or more inputs in input window 310. The series of prompts depicted in FIG. 4A and FIG. 4B each contain an optional number that indicates the location of the prompt in the series of prompts (e.g., numbers "4." in prior prompt 402 through number "8." in upcoming prompt 420).

FIG. 4A depicts an exemplary GUI 304 at a first time and FIG. 4B depicts an exemplary GUI 304 at another time (e.g., a later time). As discussed above, in the embodiment shown in FIG. 4A, each of prior response window 306, prompt window 308, and preview window 312 are configured to display a prompt or response. Prompt window 308 contains a present prompt 404 and input window 310 is configured to receive information responsive to present prompt 404. Present prompt 404 is prominently displayed in bold text that is larger than any other text present on GUI 304. This is an example of the prominent display associated with prompt window 308, as discussed above. It is to be appreciated that present prompt 404 may be depicted in any manner that makes it appear more prominently than the other content on GUI 304 or otherwise draws the attention of a user. In this example, present prompt 404 contains a number indicating its position in a series of prompts (e.g., "5.").

Input window 310 is configured to receive an input responsive to present prompt 404. In this example, input window 310 comprises a plurality of predetermined responses to present prompt 404, the predetermined responses being depicted as a multiple-choice list 406 containing three optional responses to present prompt 404. Each option in multiple-choice list 406 is configured as a virtual button and selection of one button may be received as a response to present prompt 404. It is to be appreciated that a plurality of predetermined responses may be depicted in any other manner, such as a list in a drop-down menu, one or more symbols, or the like. For example, a user may determine that his or her home has a natural gas-powered HVAC system and may select option B in multiple-choice list 406. The selection may be accomplished by any means consistent with the user device. For example, if GUI 304 is displayed on a mobile device configured with a touchscreen, selection of option B may be accomplished by pressing the touchscreen at a position corresponding with option B. Similarly, if GUI 304 is displayed on a computer screen, selection of option B may be accomplished by clicking the virtual button corresponding with option B using a mouse, trackpad, or other control system.

Prior response window 306 is configured to display a prior response 402. In the example of FIG. 4A, prior response 402 includes both a prior request (i.e., "How many floors does your home have? Include the basement") and a prior response to the request (i.e., "Answer: 2"). As discussed above, it is appreciated that prior response 402 may include any other indication of receiving a prior response or other information consistent with this disclosure. In this example, prior response 402 retains the numbering associated with the series of prompts (e.g., "4."). Prior response 402 is depicted in normal font in a size smaller than that or present prompt 404. This is an example of how the content of previous response window 306 may be displayed in a manner that is less prominent than that of prompt window 308. As discussed above, it is contemplated that content depicted in prompt window 308 may be displayed in prior response window 306 after information responsive to the content of prompt window 308 has been received by input into input window 310. In this example, the prior request of prior response 402 (i.e., "4. How many floors does your home have? Include the basement") may have been displayed in place of present prompt 404 until an input (i.e., "2") was received in input window 310. Thereafter, prior response 402 may have been generated and displayed in prior response window 306.

Preview window 312 is configured to display an upcoming prompt 410. In the example of FIG. 4A, upcoming prompt 410 includes a subsequent prompt of the series of prompts. In this example, upcoming prompt 410 includes a number showing its position in the series of prompts (i.e., "6."). As discussed above, it is contemplated that after a user provides an input in input window 310 that is responsive to present prompt 404, upcoming prompt 410 will become a present prompt and will be displayed in prompt window 308 as present prompt 404. A subsequent prompt (e.g., number "7." in the series) will then become upcoming prompt 410 and will be displayed in preview window 312. In this example, upcoming prompt 410 is depicted in italic-style font in a size smaller than that of present prompt 404. This depiction is an example of a manner for making upcoming prompt 410 appear less prominent than present prompt 404.

FIG. 4B depicts GUI 304 at a second, later time. FIG. 4B may depict the same series of prompts as depicted in FIG. 4A. As may be appreciated, during the interval between the first time depicted in FIG. 4A and the second time depicted in FIG. 4B, a user may provide responses to prompts 5 and 6 in the series of prompts. This is most evidently shown by prompt 6 (i.e., "6. How many thermostats does your home have?") being displayed as upcoming prompt 410 in FIG. 4A and being displayed as part of prior response 412 in FIG. 4B. As discussed above, prompt 6 would first be displayed in preview window 312 as an upcoming prompt (e.g., as upcoming prompt 410, shown in FIG. 4A) as prompt 5 is displayed in prompt window 308 as a present prompt (e.g., present prompt 404, shown in FIG. 4A). After a response to prompt 5 is received from a user, prompt 6 would be displayed in prompt window 308 as a present prompt (not shown) while prompt 7 is displayed in preview window 312 as an upcoming prompt (not shown) and prompt 5 is displayed in prior response window 306 (not shown). While prompt 6 is displayed in prompt window 308, input window 310 would display an input field configured to receive an input responsive to prompt 6. After a user provides a response to prompt 6 through input window 310, prompt 6 will be displayed in prior response window 306 as part of a prior response (e.g., prior response 412, shown in FIG. 4B) while prompt 7 becomes the present prompt and is displayed in prompt window 308 (e.g., present prompt 414, shown in FIG. 4B) and prompt 8 becomes the upcoming prompt and is displayed in preview window 312 (e.g., upcoming prompt 420, shown in FIG. 4B).

FIG. 4B provides exemplary configurations of prompt window 308 and input window 310. As described above, prompt window 308 may include one or more regions. In FIG. 4B, prompt window 308 is depicted as having a first region 422 and a second region 424. First region 422 is configured to display present prompt 414, which may be displayed in substantially the same manner as described above. Second region 424 is configured to display explanation 415, which is an example of an informational or explanatory statement relating to the request displayed as present prompt 414. As discussed above, explanation 415 provide the user information relating to why the information requested by present prompt 414 is being requested (e.g., how it will be used or why it is necessary). As may be appreciated by the depiction in FIG. 4B, prompt window 308 may adjust in shape or size to accommodate first region 422 and second region 424. Some prompts may not have an informational or explanatory statement, in which case, prompt window 308 may be configured to display the prompt without having either first region 422 or second region 424 or may be configured to display the prompt with a first region 422 sizes substantially the same as prompt window 308.

As described above, input window 310 may be configured to receive any type of input. In FIG. 4B, input window 310 includes a text box 416 and a button 418. Text box 416 may be configured to receive a textual response from a user. The textual response may be input by any means known in the art, for example, through a physical or virtual keyboard. Button 418 may be configured to receive an indication from a user that a textual input in text box 416 is complete. Upon receiving the indication, input window 310 may receive the textual input. The indication to button 418 may include a click or other means of pressing the virtual button, as known in the art and discussed above.

GUI 304 may be generated by a processor. For example, processing device 202 of FIG. 2 (herein referred to as processing device, processor, and one or more processors). The processor may likewise perform the processes and methods disclosed herein and any others required to display a GUI consistent with this disclosure. For example, processing device 202 may use memory interface device 206 to access memory device 210 and locate GUI instructions 212, which may indude instructions for displaying GUI 304 as discussed above. GUI instructions may include a plurality of instructions for generating various types of GUI and for transforming GUI 304 in response to user input. Processing device 202 may determine which instructions within GUI instructions 212 apply to a current situation. Processing device 202 may then use network interface device 204 to transmit instructions for causing user device 104 to display GUI 304 consistent with the determined instructions.

Figure 5A:
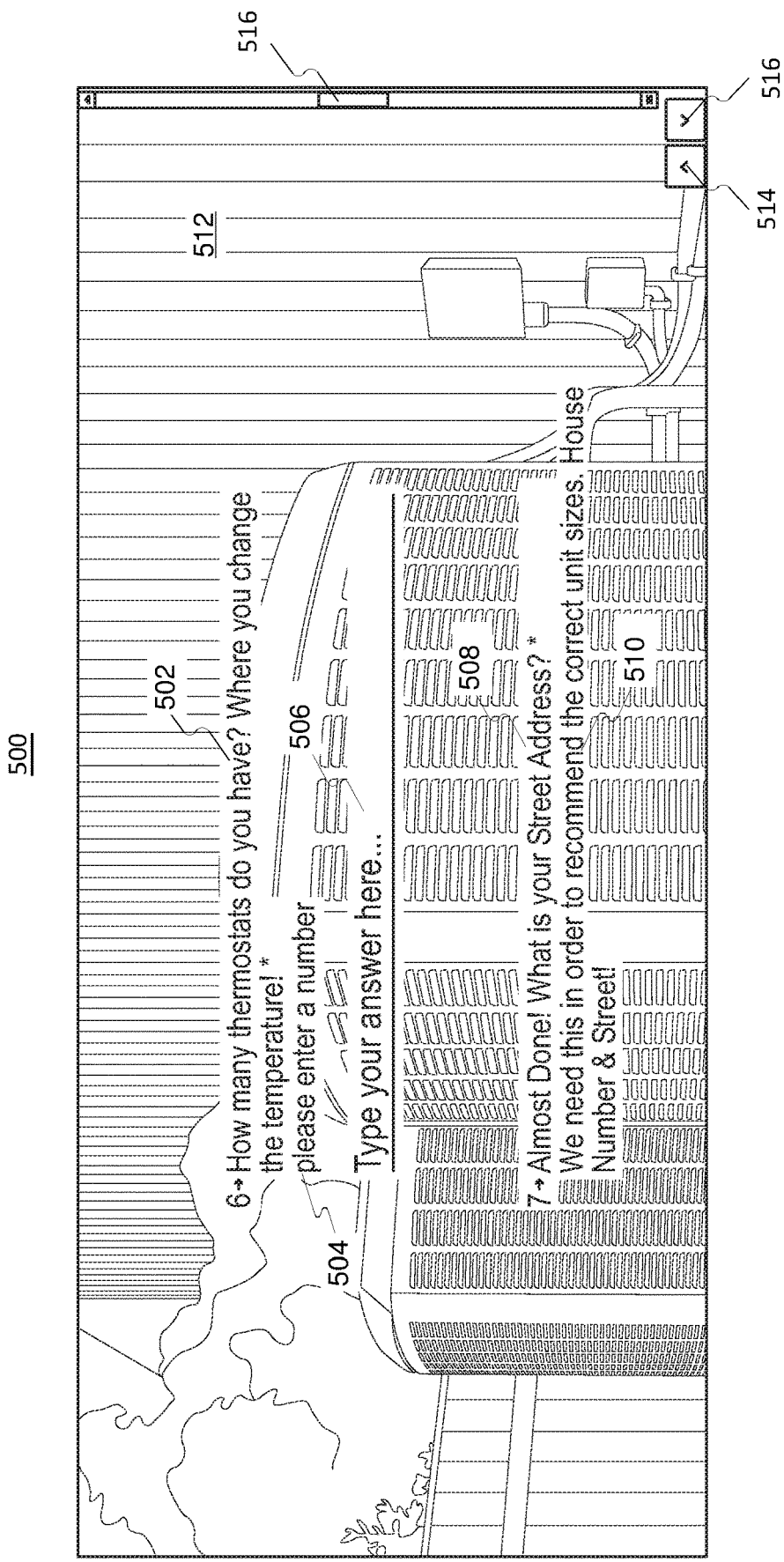
FIG. 5A is an illustration of an exemplary configuration of a GUI consistent with this disclosure.
Figure 5B:
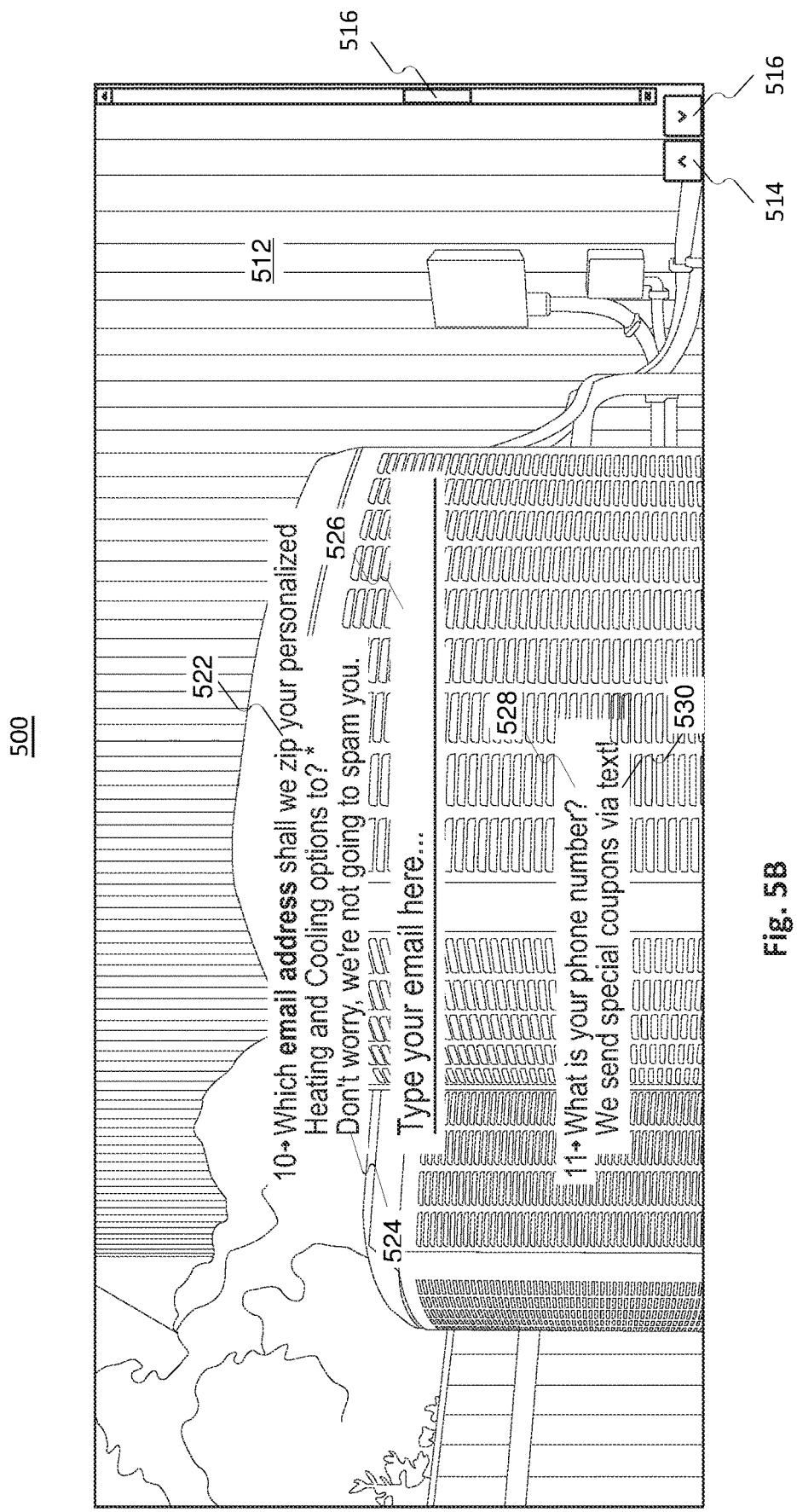
FIG. 5B is an illustration of an exemplary configuration of a GUI consistent with this disclosure.

FIG. 5A and FIG. 5B are exemplary embodiments of a GUI 500 consistent with this disclosure. FIG. 5A may depict GUI 500 at a first time and FIG. 5B may depict GUI 500 at a second time. Processing device 202 may cause a user device 104 to display GUI 500, for example, by executing GUI instructions 212 and transmitting the instructions to user device 104 over network 106. GUI 500 may be displayed by any other means consistent with this disclosure, including those discussed in relation to GUI 304. GUI 500 may be configured to display a series of prompts and to receive information responsive to the prompts.

GUI 500 may have one or more features that may be visually and/or operatively the same at the first time (depicted in FIG. 5A) and the second time (depicted in FIG. 5B). For example, at both times, GUI 500 may include navigation buttons 514 and 516, scroll bar 516, a combination thereof or other means for navigating through GUI 500. Scroll bar 516 may be used to navigate through GUI 500 by, for example, by dragging scroll bar 516 in an upward or downward direction, in response to which one or more elements of GUI 500 may move in a corresponding direction. Navigation buttons 514 and 516 may be used to navigate through GUI 500 by, for example, incrementally moving the elements on GUI 500 in response to a click or other activation of either navigation button 514 or navigation button 516. In some embodiments, the incremental movement may correspond with one or more elements on GUI 500. For example, if GUI 500 is displaying a prompt from a series of prompts and a user clicks navigation button 516, GUI 500 may display a subsequent prompt from the series of prompts. As another example, at both times, GUI 500 may include background 512, which in this example is an image of a portion of an HVAC system in a residential setting. Background 512 may comprise an image, a solid color, a logo, a diagram, or any other graphic. In some embodiments background 512 may be static, that is, background 512 may remain in substantially the same position at all times while GUI 500 is displayed. In some embodiments, background 512 may be dynamic, that is, background 512 may change, move, or adjust as GUI 500 displays different elements. For example, background 512 may move in a direction corresponding with a navigational input, for example, a click of o navigation buttons 514 or 516 or scroll bar 516.

GUI 500, as shown in FIG. 5A, may be configured to display a series of prompts. In some embodiments, prompt 502 may include a present request for information relating to a building, an HVAC system, a user, and so forth. In the example shown, prompt 502 comprises a request for a number of thermostats in a building in which an HVAC system or component is to be installed (e.g., "How many thermostats do you have? Where you change the temperature!"). As discussed above, prompt 502 may contain any other request for information, for example, an address of a building, a number of floors in the building, one or more user preferences relating to an HVAC system, identifying information of the user, and so forth. In this example, prompt 502 is depicted as a question (e.g., "How many thermostats do you have?") and an explanatory phrase (e.g., "Where you change the temperature!"). Consistent with this disclosure, prompt 502 may be displayed in any other format or including any other information. In some embodiments, prompt 502 may be substantially the same as present prompt 404 or 414 as shown in FIGS. 4A and 4B respectively.

GUI 500 may include prompt explanation 504. Prompt explanation 504 may include any information that may aid a user in responding to prompt 502. For example, prompt explanation 504 may include instructions for responding to prompt 502, an explanation of why the information request by prompt 502 is needed or how it is used, an example of a proper response to prompt 502, and so forth. In the example of FIG. 5A, prompt explanation 504 includes textual directions for responding to prompt 502 (e.g., "please enter a number"). In some embodiments, prompt 502 may include explanatory information and prompt explanation 504 may include additional information. For example, prompt 502 includes a phrase explaining what a thermostat is (e.g., "where you change the temperature"), and prompt explanation 504 includes directions for responding to prompt 502 (e.g., "please enter a number"). In some embodiments, prompt 502 may include all of the explanatory or supplemental information related to the request for information. For example, prompt 502 may include the information included in the explanatory phrase and in prompt explanation 504, in which case, prompt explanation 504 may be excluded from GUI 500. In some embodiments, prompt explanation 504 may include all explanatory or supplemental information related to the request for information. For example, prompt explanation 504, in the example of FIG. 5A, could include the text "A thermostat is where you change the temperature. Please enter a number" or similar explanation. In some embodiments, prompt explanation 504 may be displayed just below prompt 502. In some embodiments, prompt explanation 504 may be displayed only if a user provides or attempts to provide a response that does not correspond with the request. For example, prompt explanation 504 may be displayed in response to an attempt by a user to provide an input that is not a number. In some embodiments, prompt explanation 504 may be displayed upon a request by a user. For example, GUI 500 may include means for a user to seek additional information related to prompt 502, and prompt explanation 504 may be displayed if a user activates the means for seeking additional information.

GUI 500 may include input field 506. Input field 506 may be displayed in association with prompt 502, such as being positioned just below prompt 502 and/or prompt explanation 504. Input field 506 may be configured to receive information from a user, the information being responsive to prompt 502. Input field 506 may include any means for receiving information consistent with this disclosure. For example, input field 506 may include a predetermined list and a user may provide an input by selecting an option from the predetermined list. As another example, input field 506 may include a text box and a user may provide an input by typing (e.g., on a keyboard or virtual keyboard) a textual response and submitting the textual response. The example in FIG. 5A includes a text box having placeholder text (e.g., "type your answer here . . . ") in a position where a user may type a textual response to prompt 502. Input field 506 may be configured in any other manner, including as discussed with relation to input window 310.

GUI 500 may include upcoming prompt 508. Upcoming prompt 508 may be displayed, for example, below input field 506. Upcoming prompt 508 may include a request for information from a user, the request being a subsequent prompt in the series of prompts and the one for which a user may provide a response after responding to prompt 502. Upcoming prompt 508 may include a number or other indicator of its position in the series of prompts (e.g., "7. Almost Done!"). Upcoming prompt 508 may include any information that may be included in a prompt, as discussed in relation with prompt 502, or a portion of such information. For example, in FIG. 5A, upcoming prompt 508 includes a request for information (e.g., "What is your Street Address?"). In some embodiments, upcoming prompt 508 may be accompanied by upcoming prompt explanation 510. Upcoming prompt explanation 510 may include any information related to upcoming prompt 508, including those discussed in relation to prompt explanation 504. In the example of FIG. 5A, upcoming prompt explanation 510 includes an explanation of why the information requested by upcoming prompt 508 is needed (e.g., "We need this in order to recommend the correct unit sizes") and an explanation of the type of input that would be responsive to upcoming prompt 508 (e.g. "House Number & Street!").

In some embodiments, upcoming prompt 508 may be displayed in a font, size, or color different from that of prompt 502 or otherwise distinguished from prompt 502 such that a user may recognize that he or she is to provide a response to prompt 502 rather than to upcoming prompt 508. Examples of less prominent displays that may be used for upcoming prompt 508 and/or upcoming prompt explanation 510 are discussed in relation to preview window 312 of GUI 304.

One of skill in the art having the benefit of this disclosure may understand that GUI 500 may include additional, fewer, or modified elements. For example, GUI 500 may include a display of one or more previously received responses, as discussed in relation to prior response window 306. In some embodiments, GUI 500 may contain only a first prompt and/or a first input field. For example, GUI 500 may include prompt 502 and input field 506 only. In some embodiments, GUI 500 may include a plurality of prompts and a plurality of input fields associated with the prompts. For example, GUI 500 may include a first prompt having a first corresponding input field and a second prompt having a second corresponding input field.

FIG. 5B provides additional examples of the configuration of GUI 500. FIG. 5B depicts GUI 500 at a different point in time relative to GUI 500 as shown in FIG. 5A. For example, at a first time GUI 500 may include prompt 502, prompt explanation 504, input field 506, upcoming prompt 508, and upcoming prompt explanation 510 as shown in FIG. 5A and at a second time GUI 500 may include prompt 522, prompt explanation 524, input field 526, upcoming prompt 528, and upcoming prompt explanation 530.

Prompt 522 is an example of a request for information relating to contact information (e.g., an email address) of a user. Prompt 522 may be substantially the same as prompt 502. For example, it is contemplated that prompt 522 is displayed in substantially the same location as prompt 502, prompt 522 having replaced prompt 502 as a user provided answers to prompt 502 and subsequent prompts in the series of prompts. Like prompt 502, prompt 522 may include an indicator of its position in a series of prompts (e.g., "10") and a request for information from a user. In this example, prompt 522 includes a request for information (e.g., an "email address") and an explanation of why that information is needed (e.g., to "zip your personalized Heating and Cooling options to"). Prompt explanation 524 is an example of an explanation that provides supplemental information rather than directions or instructions. For example, prompt explanation 524 includes information that may ease the concerns of a user who may be uneasy about providing the information requested by prompt 522 (e.g., "Don't worry, we're not going to spam you."). Similar prompt explanations may be particularly useful whenever a prompt includes a request for personal or contact information of a user, such as an address, an email address, a name, a phone number, etc.

Upcoming prompt 528 may be substantially similar to upcoming prompt 508 and may display a subsequent prompt in a series of prompts corresponding with prompt 522. Like upcoming prompt 508, upcoming prompt 528 may include an indicator of its position in a series of prompts (e.g., "11") and a request for information from a user. Upcoming prompt 528 may or may not be displayed with a corresponding input field. In the example of FIG. 5B, upcoming prompt 528 is not displayed with an accompanying input field, which may ensure that a user respond to prompt 522 before attempting to respond to upcoming prompt 528. Upcoming prompt 528 may be accompanied by upcoming prompt explanation 530. Upcoming prompt explanation 530 may be substantially the same as upcoming prompt 510. For example, upcoming prompt 530 may include an explanation of how the requested information may be used (e.g., "We send special coupons via text!").

GUI 304 and GUI 500 are examples of GUIs that may be used to collect and display information to a user consistent with this disclosure. They are not limiting. One of skill in the art with the benefit of this disclosure may understand that either GUIs 304 and 500 may contain any other information consistent with this disclosure and may be in any other configuration. In some embodiments GUI 304 and/or GUI 500 may be configured to display one or more HVAC components corresponding with the information received from a user of GUI 304 and/or GUI 500.

Figure 6:
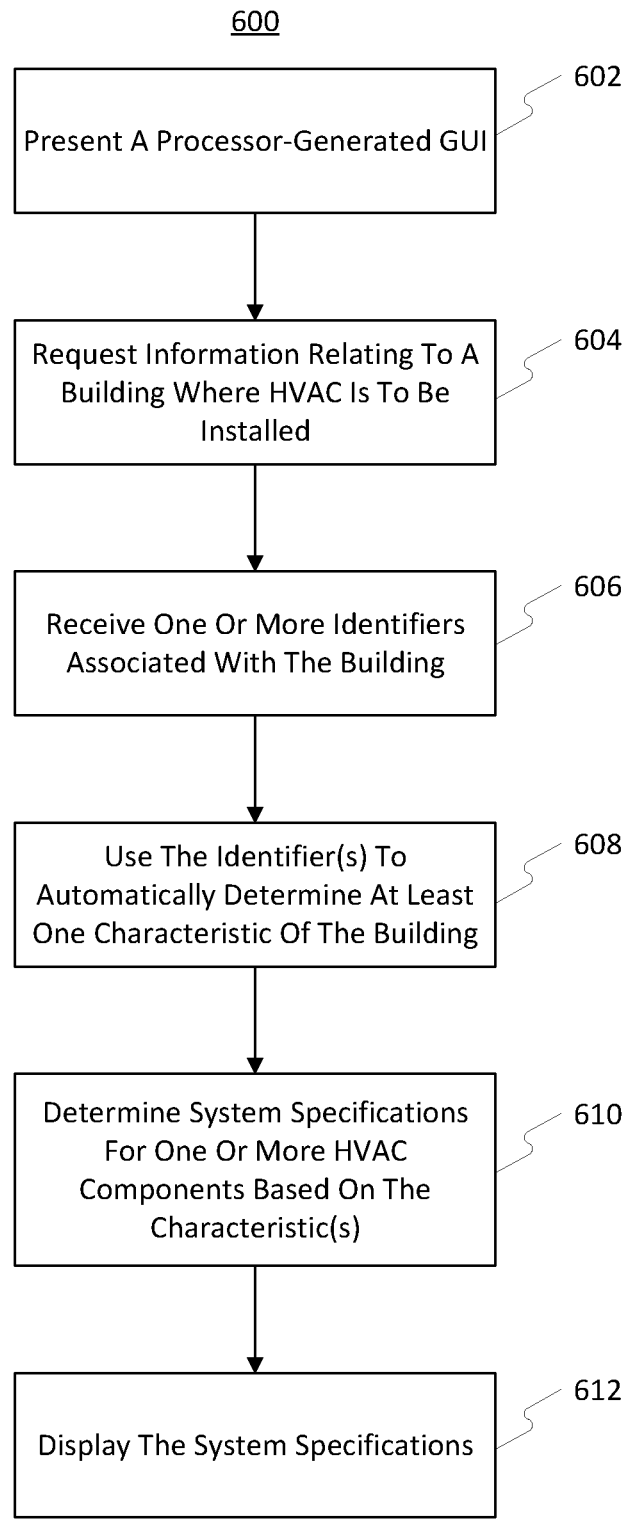
FIG. 6 is a flowchart depicting an exemplary method for automatically determining system specifications for one or more HVAC components consistent with this disclosure.

Consistent with the present disclosure, the processor may be configured to perform a method for automatically determining system specifications for one or more HVAC components using a processor-generated GUI. FIG. 6 represents an exemplary method 600 for determining the system specification for one or more HVAC components. The method may include a step 602 for presenting a processor-generated GUI to a user. The GUI may be presented to a user through a display device, for example, on a display on user device 104. The GUI may be configured as described above or in any other manner consistent with this disclosure. The method may include a step 604 for requesting information relating to a building where on or more HVAC components are to be installed. The information may be requested through the GUI presented in step 602. The method may include a step 606 for receiving one or more identifiers associated with the building. The one or more identifiers may be received from a user via an input field associated with the GUI. For example, the identifier may be received through an input in input window 310 of GUI 304 or through an input in input field 506 of GUI 500. The method may include a step 608 for automatically determining at least one characteristic of the building. Step 608 may include accessing a database and using the one or more received identifiers to determine at least one characteristic associated with the building. The database may include one or more public APIs, a database stored in communication with the processor, a combination thereof, or any other database containing characteristics of buildings. The method may include a step 610 for determining system specifications for one or more HVAC components based on the determined characteristics associated with the building. Additionally or alternatively, the system specifications may be determined using the characteristics and other information, such as the identifiers received at step 606. The system specifications may include a size, flow rate, or other quality associated with the HVAC components. The method may include a step 612 for displaying the determined system specifications for the one or more HVAC components. The system specifications may be displayed on a GUI. The GUI used to display the system specifications may be the same GUI used to request and receive information at step 604 and step 606 respectively. Particulars of the steps of method 600 are discussed below.

Consistent with the present disclosure, the processor may be programmed to present a GUI to a user via a display and request information. The information may relate to a building where one or more HVAC components are to be installed. The GUI may be substantially the same as GUI 304 of GUI 500 disclosed above. The GUI may be displayed on any device in communication with the processor. For example, processing device 202 may transmit instructions over network 106 for causing user device 104 to display the GUI on a screen or other display device associated with user device 104. Additionally or alternatively, processing device 202 may be located in a device that contains one or more display devices and the instructions for causing the display of the GUI may be provided directly to the display. The GUI may be presented to a user as part of step 602 of method 600.

The requested information may be any information consistent with this disclosure. In some embodiments, the requested information may include one or more identifiers associated with a building. The one or more identifiers may include information relating to the building, such as its location, current configuration, and so forth. For example, the one or more indicators may include at least one of an address associated with the building, a number of pre-existing HVAC controls in the building, a number of floors within the building, an indicator of the power source for the HVAC components, or an indication of energy efficiency updates in the building. In some embodiments, there may be a minimum number of identifiers need to determine an HVAC system or component specification. A list of minimum identifiers needed to determine an HVAC system or component specification may be stored in a location accessible by the processor. For example, the list of minimum identifiers may be stored in memory device 201, database 114, or in another memory device in communication with processing device 202. The list of minimum identifiers may be stored, for example, in database 114 as part of HVAC system specification data 234 or as part of other data 236.

The requested information may additionally or alternatively include one or more indicators relating to user preferences for an HVAC system or component. For example, the one or more indicators may include price preferences of the user, energy efficiency preferences of the user, manufacturer preferences of the user, or other user preferences. In some embodiments, there may be no distinction between the identifiers associated with the building and indicators associated with the user preferences.

As discussed above, the information may be displayed and requested using a GUI similar to that of GUI 304 and/or GUI 500. For example, the requested information may be displayed in prompt window 308. The requested information may include a plurality of identifiers, for example, and may be requested by a series of prompts. In this example, one prompt of the series of prompts may be displayed at a time and subsequent prompts may be displayed in response to receiving the information requested by the prompt. In some embodiments, the series of prompts may cycle through one or more positions with the GUI such that a response to one or more prompts may be obtained. For example, the series of prompts may cycle through preview window 312, prompt window 308, and prior response window 306 as discussed above with relation to FIG. 4A and FIG. 4B.

Consistent with the present disclosure, the processor may be programmed to receive one or more identifiers associated with a building. The one or more identifiers may be received from a user through an input field associated with a GUI. The one or more identifiers may include any information disclosed above or any other information useful for determining a specification for an HVAC system or one or more HVAC components. The identifiers may be received by an input responsive to a display of requested information. For example, the information requested as part of step 604 of method 600 may be received as part of step 606.

As described above, the identifiers may be requested by a display of one or more prompts on a user device. In some embodiments, the identifiers may be received in response to the displayed prompts. For example, a first request may be displayed in prompt window 308 of GUI 304 and an identifier may be received as an input into input window 310. In another example, a first request may be displayed as prompt 502 in GUI 500 and an identifier may be received as an input into input field 506. The received input may be transmitted to processing device 202 over network 106. Processing device 202 may then determine whether additional information or identifiers are needed to determine a system specification for one or more HVAC components. For example, in embodiments where a list of minimum identifiers needed to determine an HVAC system or component specification is stored in, for example, HVAC system specification data 234, processing device 202 may compare the received identifier with the list to determine subsequent identifiers that are needed. Processing device 202 may then be configured to request subsequent identifiers and repeat the process until all of the minimum required identifiers are received from the user. In some embodiments, processing device may be configured to repeat steps 604 and 606 of method 600 until the minimum required identifiers are obtained.

In other embodiments, a series of requests corresponding with the minimum required identifiers may be transmitted to the user device at substantially the same time, and the GUI may be configured to request the information and receive the identifiers through a series of prompts. This embodiment may be substantially the same as that described in FIG. 4A and FIG. 4B.

Consistent with the present disclosure, the processor may be programmed to access a database to automatically determine at least one characteristic associated with a building. The processor may be configured to use the one or more identifiers to access the database and determine the characteristics. The at least one characteristic associated with the building may be any characteristic disclosed herein. For example, the characteristic may be a square footage of the building, a geographical location associated with the building, a climate associated with the building, one or more energy efficiency laws or regulations associated with the building, and so forth. The processor may access the database as part of step 608 of method 600. The identifier used to access the database may include an identifier received as an input at step 606 of method 600.

In some embodiments, the database may be one stored on a memory associated with the processor. In these embodiments, accessing the database may comprise accessing a database located on one or more memory devices. For example, the database may be database 114 stored on memory device 210. The databases may be accessed and data relating to a characteristic of a building may be located or determined based on data stored on the database. For example, processing device 202 may access building characteristic data 232 located on database 114 using memory interface device 206. Building characteristic data 232 may include, for example, climate information associated with a plurality of geographical locations. As an example, building characteristic data 232 may include an average climate for the arid Southwest region of the United States and an average climate for the oceanic Pacific Northwest region of the United States. In this example, processing device 202 may receive an identifier comprising an address of the building and may use the address to determine that the building is in a certain geographical location. The geographical location may then be compared with the data stored in building characteristic data 232 to determine a climate associated with the building. It is understood that any other characteristic of a building may be determined by access a database stored in association with the processor.

In some embodiments, the database may be maintained by a public API provider. In these embodiments, accessing a database to determine a characteristic may comprise accessing the database maintained by the public API provider. The database may be accessed remotely. For example, the public API may be accessed via the Internet, an intranet, Bluetooth®, or other wireless or wired connection. For example, processing device 202 may access a database locates on public API 108 using network 106. Public API 108 may include one or more databases containing data determined, maintained, or derived by the public API provider. Some examples of public API providers that may be accessed include Zillow®, Trulia®, Google Maps®, National Weather Service, Yelp Fusion®, and so forth.

As an example, automatically determining the at least one characteristic may comprise determining a square footage associated with the building, and the square footage may be determined by accessing a database. Determining the square footage of the building may be useful for determining a size or flow rate needed to heat and cool the building. In this example, processing device 202 may receive an indicator comprising an address of the building in which the HVAC system or component is to be installed, repaired, or updated. In some embodiments, the address may have been received from a user input in input window 310 of GUI 304 or input field 506 of GUI 500 as part of step 606 of method 600, as described above. Processing device 202 may determine which database to access to determine the square footage of the building. For example, processing device 202 may receive API accessing instructions 218 from memory device 210 and determine that the Zillow® API may contain the square footage of the building associated with the received address. Processing device 202 may then access the Zillow® API over network 106, for example. By providing the received address to the Zillow® API, processing device 202 can determine a square footage associated with the building corresponding with the address.

As another example, automatically determining a characteristic may comprise accessing a geographic climate database and using one or more identifiers associated with the building to determine climate information associated with the building. The climate information may be determined in substantially the same manner as described above with respect to determining a square footage of the building. For example, processing device 202 may access public API 108, which may include weather or climate data. For example, public API 108 may be a public API maintained by the National Weather Service. Processing device 202 may provide an address of the building, which may have been received as an identifier from a user of GUI 304, to the National Weather Service API and the National Weather Service API may provide climate information associated with the address. For example, the climate information may include climate trends associated with the address, an average climate associated with the address, the median climate conditions for the address, the extremes of the climate associated with the address, and so forth. In some embodiments, processing device 202 may match climate information determined by accessing the public API with predetermined climate conditions used in the HVAC industry. For example, manufacturers of HVAC systems may classify HVAC components based on predefined climate zones (discussed further below), and processing device 202 may compare the determined climate information to determine in which zone the building is classified.

Figure 7:
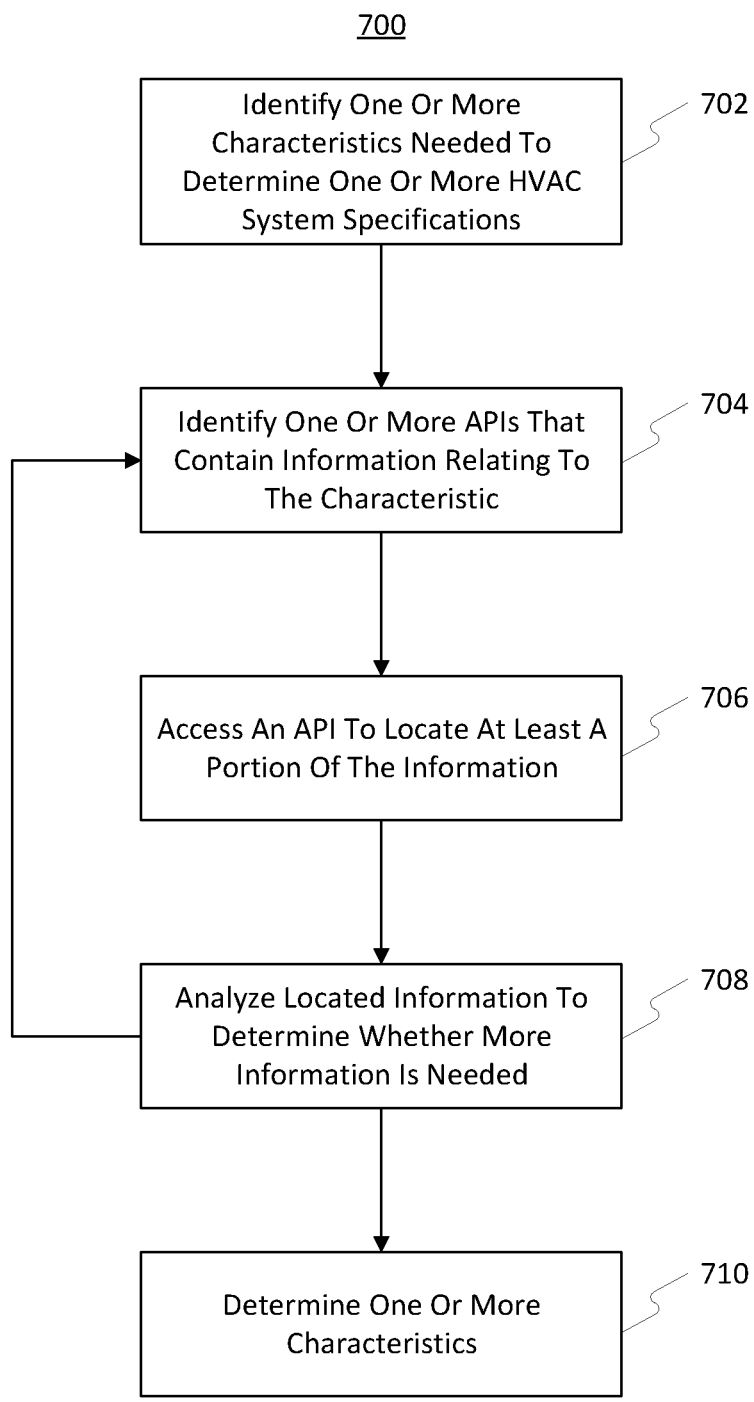
FIG. 7 is a flowchart depicting an exemplary process for determining one or more characteristics associated with a building consistent with this disclosure.

Consistent with this disclosure, accessing a database and automatically determining one or more characteristics associated with a building may comprise determining a plurality of characteristics associated with the building. Each of the plurality of characteristics may be determined as described above. FIG. 7 provides a flowchart representing an exemplary process 700 for determining a plurality of characteristics. Processes 700 may be performed as part of method 600, for example as part of step 608, or may be performed in isolation. Processes 700 is exemplary only and the one or more characteristics may be determined by any techniques disclosed herein.

FIG. 7 provides an exemplary process 700 for automatically determining one or more characteristics associated with a building using one or more identifiers associated with the building. Process 700 may include a step 702 for identifying one or more characteristics useful for or needed to determine one or more HVAC system or component specifications. The one or more characteristics may be identified, for example, by determining what information has been received from a user, for example as an identifier, and determining what information is needed. Processing device 202 may access, for example, HVAC system specification data 234 on database 114, which may contain a list of information that is needed to determine HVAC system specifications. As an example, to determine HVAC system specifications, processing device 202 may require a square footage of the building, a number of floors of the building, a number of thermostats in the building, an average climate associated with the building, and an indication of pre-existing HVAC components in the building. This list is exemplary only and is not intended to be limiting, HVAC system specifications may be determined with more, less, or different information. As an example, processing device 202 may compare data received from a user, for example as an input into input window 310 of GUI 304, and determine that it has not received the square footage or the climate information associated with the building. In this example, at the end of step 702, processing device 202 may identify that both the square footage and climate information are needed.

Process 700 may include a step 704 for identifying one or more public APIs that contain the information relating to a characteristic identified in step 702. For example, processing device 202 may access API accessing instructions 216 on memory 210 to identify the public API(s) that contain the required characteristics. Continuing the above example, processing device 202 may determine that the Zillow® API is likely to contain information relating to the square footage of the building. Processing device 202 may then proceed to step 706 of process 700 to access the identified API to locate at least a portion of the information needed to determine the square footage of the building. During step 706, processing device 202 may provide the address associated with the building to the Zillow® API and receive a square footage associated with the building.

Process 700 may include a step 708 for determining whether more information is needed to determine the characteristic. Continuing the square footage example, if the results from the Zillow® API include the square footage, processing device 202 may determine that no additional information is required to determine the square footage of the building. Accordingly, processing device 202 may proceed to step 710 for determining the characteristic. In this example, the square footage of the building was provided directly from the Zillow® API so determining the characteristic (i.e., the square footage) may not require any additional analysis. Processing device 202 may then determine that the square footage of the building is that provided by the Zillow® API.

In other embodiments, the information received from the API at step 706 may not be sufficient to determine the one or more characteristic. In this instance, process 700 may be configured such that steps 704 though 708 may be repeated until the information obtained from the API(s) is sufficient to determine the characteristic. In the same example, where it was determined at step 702 that a square footage and an average climate characteristic are needed to determine the HVAC specifications, the average climate characteristic serves as an example of a characteristic that may require accessing more than one API to determine. For example, at step 704, processing device 202 may determine that no one public API may provide an average climate associated with an address of the building. However, processing device 202 may identify a plurality of public APIs that contain a portion of the information needed to determine the average climate. Processing device 202 may then select a first API to access to acquire a first portion of the information. For example, processing device 202 may, at step 706, access the Google Maps® API to determine a geographical location associated with a provided address. At step 708, processing device 202 may determine that the geographical location is not alone sufficient to determine the average climate associated with the building. Processing device 202 may then proceed by repeating step 704 and identifying a second API that may contain additional information useful for determining the average climate. For example, at step 706, processing device 202 may access the National Weather Service API to determine weather or climate trends associated with the geographic location determined by the Google Maps® API. Steps 704 though 708 may be repeated until, at step 708, processing device 202 determines that no additional information is required. For example, at step 708, processing device 202 may determine that simple calculations can be used to derive an average climate from the geographic location provided by the Google Maps® API and the weather information provided by the National Weather Service API. Processing device 202 may then proceed to step 710 to calculate the average climate, for example, using the geographic location and the weather information. It is contemplated that any characteristic may be determined by any number of repetitions of process 700.

Consistent with this disclosure, the processor may be programmed to determine system specifications for one or more HVAC components. The system specifications may be determined based at least in part on at least one characteristic associated with a building. The system specification may be determined as part of method 600, for example, at step 610. The system specifications may be determined using one or more identifiers associated with the building, for example, one or more identifiers provided by a user at step 606 of method 600. The system specification may additionally or alternatively be determined using one or more characteristics of the building, for example, one or more of the characteristics determined at step 608 of method 600 or determined by process 700.

As described above, the one or more system specifications may include any requirement, dimension, shape, characteristic, or feature of one or more HVAC components. For example, a system specification may include a physical size of an HVAC component. In another example, a system specification may include a flow rate or capacity at which an HVAC system or component may operate, SEER rating, efficiency, etc. In some embodiments, determining the system specifications may include determining a capacity requirement of one or more HVAC components. The capacity requirement may be determined based on, for example, the climate information associated with a building, the square footage associated with the building, a combination thereof, or any other identifiers or characteristics associated with the building.

Consistent with this disclosure, determining the system specifications may include determining a modified square footage and comparing the modified square footage with one or more system specifications corresponding with geographical HVAC system requirements. The modified square footage may be determined by multiplying the square footage by a predetermined value corresponding with the number of floors within the building and the number of thermostats or other HVAC controls in the building. In other embodiments, the modified square footage may be determined by multiplying by a predetermined value corresponding with the number of floors in the building and dividing by the number of thermostats in the building. For example, determining a system or component specification may include determining a modified square footage and comparing the modified square footage with a plurality of values corresponding to HVAC requirements in different climate zones. As an example, a modified square footage may be determined by the formula:

$$MSF = a*f/t$$

MSF is the modified square footage. While the value is expressed as a modified square footage, it is understood that it may be expressed in any unit of measurement corresponding with an area (e.g., square foot, square meters, acre, etc.). The area a of the building may be reported by an API or by a user. For example, area a may be the area determined by access a public API, for example, at step 608 of method 600. Wherein f is a predetermined value corresponding with the number of floors in a building. As discussed above, the number of floors in a building may be input by a user, for example as an identifier at step 606 of method 600, or determined by a processor, for example as a characteristic determined at step 608 of method 600. As an example, predetermined value f may be selected from the following table:

TABLE 1

Predetermined Value f For a Building With Up to Six Floors

| Number of Floors in Building | Predetermined Value f |
|---|---|
| 1 | 1 |
| 2 | 0.50 |
| 3 | 0.66 |
| 4 | 0.75 |
| 5 | 0.80 |
| 6 | 0.83 |

Wherein t is the number of thermostats or other HVAC control units associated with the building. As discussed above, the number of thermostats may be provided by a user, for example as an input of an identifier at step 606 of method 600, or determined by a processor, for example as a characteristic determined at step 608 of method 600. The formula disclosed above may be saved, for example, in HVAC system specification data 234 or HVAC component data 230 located on database 114 of system 100. Processing device 202 may perform the operations consistent with the formula in response to receiving, for example, data processing instructions 214 from memory device 210.

Modified square footage MSF may be compared to predetermined climate zones to determine a system specification. For example, system 100 may contain data relating to the tonnage (size) requirements needed to adequately cool and heat a modified square footage in a plurality of predetermined climate zones. The predetermined zones and tonnage requirements may be saved, for example, in HVAC system specification data 234 on database 114 or may be accessed from another storage device over network 106. For example, the system requirements may be as follows:

TABLE 2

Tonnage Required to Heat/Cool a Range of Modified Square Feet MSF for Each of Five Predetermined Climate Zones.

|  | Zone 1 | Zone 2 | Zone 3 | Zone 4 | Zone 5 |
| --- | --- | --- | --- | --- | --- |
| 1.5 Ton | 600-900 | 600-950 | 600-1000 | 700-1050 | 700-1100 |
| 2 Ton | 901-1200 | 951-1250 | 1001-1300 | 1051-1350 | 1101-1400 |
| 2.5 Ton | 1201-1500 | 1251-1550 | 1301-1600 | 1351-1600 | 1401-1650 |
| 3 Ton | 1501-1800 | 1551-1850 | 1601-1900 | 1601-2000 | 1651-2100 |
| 3.5 Ton | 1801-2100 | 1851-2150 | 1901-2200 | 2001-2250 | 2101-2300 |
| 4 Ton | 2101-2400 | 2151-2500 | 2201-2600 | 2251-2600 | 2301-2700 |
| 5 Ton | 2401-3000 | 2501-3100 | 2601-3200 | 2601-3300 | 2701-3300 |

As an example, if the modified square footage MSF determined for a building is 1200 square feet and the building is located in zone 3, then an HVAC system of 2 tons may be required to heat and cool the building. Each zone of the predetermined climate zones may be associated with a plurality of different geographic locations having similar climate trends. Geographic locations may be associated with one of the zones based on, for example, an average climate of the geographic location, the extremes of the weather experienced at the geographic location, or any other climate or weather pattern. For example, zone 1, which requires a higher tonnage per modified square foot than the other zones, may represent geographic locations that experience extreme high temperatures in the summer and extreme low temperatures in the winter. In another example, zone 1 may represent the geographic locations with either the highest temperatures in the summer or the lowest temperature in the winter.

Figure 8:
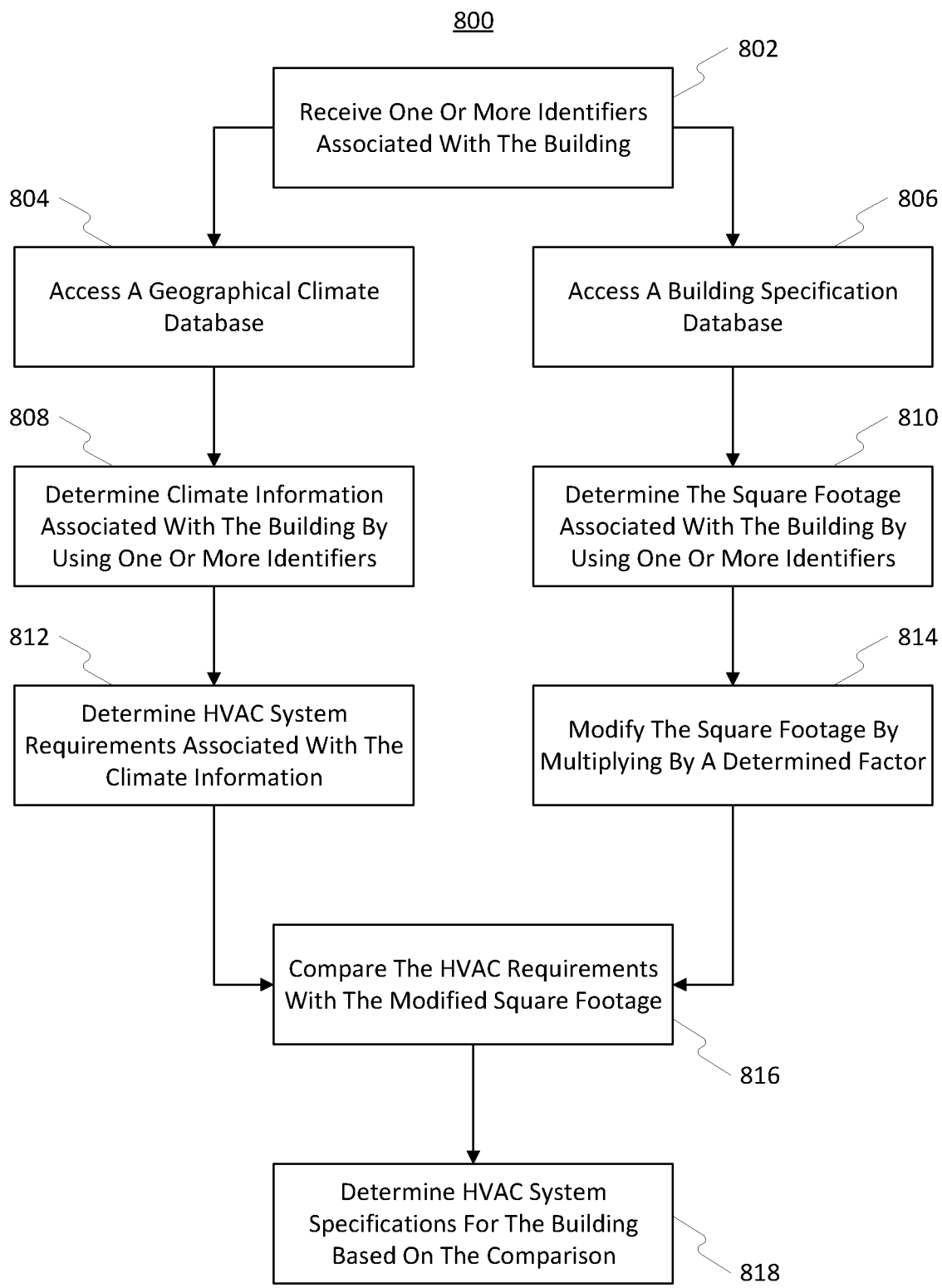
FIG. 8 is a flowchart depicting an exemplary process for automatically determining system specifications for one or more HVAC components consistent with this disclosure.

FIG. 8 provides an exemplary process 800 for determining one or more HVAC system specifications. Process 800 may be compatible with the formula disclosed above and with tables 1 and 2. Process 800 may be performed as part of method 600, for example as part of step 610, or in isolation. Process 800 may include a step 802 of receiving one or more identifiers associated with the building, which may correspond with step 606 of method 600. Consistent with other examples, the one or more identifiers may include an address associated with a building in which an HVAC system is to be installed. Process 800 may include a step 804 for accessing a geographical climate database. The geographical climate database may be a public API, such as public API 108, or may be stored in communication with processing device 202, for example in database 114. Process 800 may include a step 808 for determining climate information associated with the building using one or more identifiers. For example, if the identifier is an address associated with the building, determining the climate information may comprise providing the address to one or more public APIs containing geographical information, climate information, or a combination thereof. For example, processing device 202 may provide the address to the National Weather Service API to determine climate information associated with the address. The climate information may be determined in substantially the same manner as discussed with relation to process 700. Process 800 may include a step 812 for determining HVAC system requirements associated with the climate information. Step 812 may include accessing a data containing HVAC system requirements, such as, for example, HVAC system specification data 234 or HVAC component data 230 stored on database 114. The system requirements may be substantially similar to Table 2, or a modified version thereof. For example, if the climate information is determined to be associated with Zone 4, the system requirements determined at step 812 may include a table similar to Table 2 but containing only the column associated with Zone 4.

Process 800 may include a step 816 for accessing a building specification database. The building specification database may be any database that contains information relating to the characteristics of the building, for example, the Zillow® API, another public API, or data stored on database 114. The database may be accessed by any process or technique disclosed herein. Process 800 may include a step 810 for determining the square footage associated with the building by using one or more identifiers. The square footage may be determined by any technique disclosed herein. For example, if the identifier is an address, the square footage may be determined by providing the address to the Zillow® API as discussed above. Step 800 may include a step 814 for modifying the determine square footage to determine a modified square footage. The modified square footage may be determined by any technique disclosed herein, including the formula discussed above. Additionally or alternatively, the modified square footage may be determined by multiplying the square footage by a determined value, the determined value may be a function of one or more characteristics of the building, such as its age, its number of floors, its number of thermostats, its location, and so forth.

Steps 806-814 for determining a modified square footage may be performed at substantially the same time as steps 804-812 for determining HVAC system requirements for the climate associated with the building. In other embodiments the steps 804, 806, 808, 810, 812, and 814 may be performed in any sequence and at any moment in time.

Process 800 may include a step 816 for comparing the HVAC requirements with the modified square footage. For example, step 816 may comprise comparing the modified square footage determined in step 814 with the HVAC system requirements determined in step 812. As an example, if the HVAC system requirements are those depicted in Table 2 and the modified square footage is 2200 square feet, step 816 may include locating the row and column associated with modified square footage. Process 800 may include a step 818 for determining one or more HVAC system specifications for the building based on the comparison of step 816. Continuing the example, step 816 may include determining that a 3.5 Ton HVAC system is required to heat and cool the building based on the modified square footage of 2200 square feet (as determined at step 814) and the building being in zone 4 (as determined at step 808). Process 800 is exemplary only and it is understood that one or more HVAC system specifications may be determined by other means disclosed herein.

Consistent with the present disclosure, the processor may be programmed to identify one or more HVAC components that correspond with or satisfy the determined HVAC system specifications. For example, if, by process 800 or another process, processing device 202 determines that a building requires a 3.5 ton HVAC system to effectively heat and cool the building, processing device 202 may identify a plurality of HVAC components corresponding with the 3.5 ton system. Identifying the one or more HVAC components corresponding with the determined HVAC system specifications may be performed as part of method 600, for example as part of step 610, or may be performed as an additional or supplemental step to method 600.

Identifying one or more HVAC components corresponding with the HVAC system specification may include accessing an HVAC product database and automatically determining one or more available HVAC products corresponding with the determined system specifications. The HVAC product database may be accessed over network 106 or by any other means disclosed herein. For example, processing device 202 may access HVAC product data stored in, for example, HVAC component data 230 on database 114, or processing device 202 may access HVAC product data stores on a remote database, for example, one maintained by an HVAC component manufacturer. Identifying the one or HVAC components may include comparing a determined system specification with listed specifications of the one or more HVAC components. For example, if processing device 202 determines that a 2.5 ton HVAC system is required for a building, processing device 202 may compare the 2.5 ton figure with a plurality of products on a manufactures website or product database to determine one or more that are at least 2.5 tons.

In some embodiments, processing device 202 may access data relation to HVAC components manufactured or distributed by a plurality of HVAC component manufacturers or distributors. This provides the advantage of identifying several options for meeting the HVAC system specification from a plurality of manufactures. For example, processing device 202 may identify one or more components available from a first manufacturer (e.g., Carrier®) an identify one or more components available form a second manufacturer (e.g., Trane®).

Consistent with this disclosure, the processor may be programmed to determine a price associated with each of the one or more identified HVAC components. The price may be determined by accessing a pricing database and automatically determining a cost estimate for the one or more HVAC components based on the determined system specifications or the identified HVAC components or a combination thereof. The pricing database may be located on a memory device in communication with the processor or on a remote database assessable by a network or by the Internet. For example, processing device 202 may access a pricing database located on memory device 210, for example in other data 236 or HVAC component data 230, or may access a pricing database located on a memory device accessible by network 106, for example on public API 108. The cost estimate may include an estimated cost for installing the HVAC system or component, an estimated cost for operating the HVAC system with the identified component (for example, a cost per month), or a combination thereof. As an example, the estimated cost may include an initial installation cost and an estimated monthly operational cost.

Consistent with this disclosure, the processor may be programmed to rank or recommend the one or more identified HVAC components. A recommendation may be determined based on any factor, characteristic, or preference consistent with this disclosure. For example, if an identifier received from a user, for example as part of step 606 of method 600, indicates a user preference for an HVAC system having a minimum efficiency standard, processing device 202 may be programmed to determine which of the identified HVAC components meet or exceed the preferred energy standards and recommend those HVAC components. In another example, processing device 202 may identify the HVAC components and a price associated therewith and rank the HVAC components based on the price. For example, the ranking may be a list of the HVAC components from least expensive to most expensive. In other examples, the ranking may be based on a combination of factors. For example, the HVAC components may be ranked based on a perceived value, such as ranking the HVAC component with the highest energy efficiency and lowest cost as the highest rank and so forth. The ranking may include a numerical rating (e.g., a ranking on a scale of 1 to 10), a descriptive ranking (e.g., "the most affordable option," "the most efficient option," etc.), a comparative ranking (e.g., one of "good," "better," "best," and so forth), or a combination thereof.

In some embodiments, processing device 202 may be configured to rank HVAC components within a predetermined group. For example, if processing device 202 identifies three HVAC components available from a first manufacturer and two HVAC components available from a second manufacturer, processing device 202 may rank the three components from the first manufacturer from best to worst and the two components form the second manufacturer from best to worst. For example, the three HVAC components from the first manufacturer may be ranked, good, better, and best among the options from the first manufacturer. This provides an unbiased ranking, giving preference to no one manufacturer over another but allows a consumer to compare HVAC components offered by each manufacturer.

The examples of rankings and recommendations disclosed above are exemplary only. It is understood that similar rankings and recommendations may be generated based on any other criteria provided by a user or determined by the processor.

Consistent with this disclosure, the processor may be programmed to display the determined specifications for the one or more HVAC components. The specifications may be displayed, for example, on a GUI. The GUI may be substantially the same as GUI 304 or GUI 500, discussed above. For example, processing device 202 may transmit instructions to a user device, such as user device 104, causing the user device to display a GUI containing information relating to the determined specifications. The display may include any information relating to the determined specification, including, for example, the identifiers, characteristics, or other data used to determine the specification. As an example, if processing device 202 determines that a building requires a 3.5 ton HVAC system based on a determined square footage and climate associated with the building, as described above, processing device 202 may instruct user device 104 to display the determined specification (e.g., "3.5 ton HVAC system"), the identifiers associated with the building (e.g., the street address, number of floors, etc.), characteristics of the building (e.g., a square footage, geographical location, etc.), data derived from the identifiers and/or characteristics (e.g., a modified square footage, an average climate, etc.), a combination thereof, or any other related information.

In some embodiments, the processor may be programmed to display a graphic associated with the information. For example, a map showing the location of a building may be displayed. This may be useful for allowing a user to determine whether processing device 202 properly identified the building, which may underlie several of the determinations such as the climate associated with the building and the square footage of the building. The graphics may be generated by processing device 202, for example, by accessing instruction for generating a graphic, or may be pulled from a database or other source, such as public API 108.

Consistent with this disclosure, the processor may be programmed to display one or more identified HVAC products or components. For example, in embodiments where processing device 202 identifies one or more HVAC components corresponding with the determined specifications, processing device 202 may cause user device 104 to display the one or more HVAC components to a user. The HVAC components may be displayed with information relating to the HVAC component. For example, the HVAC component may be displayed with information relating to its size, capacity, cost, manufacturer, efficiency, or other information. This information may be pulled, for example, from a database, such as database 114 or a database on public API 104.

In some embodiments, the processor may be programmed to display a cost estimate for the one or more HVAC products or components. The cost estimate may be determined by the processor, as described above, or pulled from a database, for example database 114 or a database on public API 104. A cost estimate may be displayed in association with a displayed HVAC component. For example, a plurality of HVAC components meeting the determined specifications may be displayed and a cost estimate for each HVAC component may be displayed in association with each HVAC component. In some embodiments, the processor may be programmed to display a ranking or recommendation associated with one or more HVAC components. For example, the ranking or recommendation may be determined as described above and displayed on a GUI.

Figure 9A:
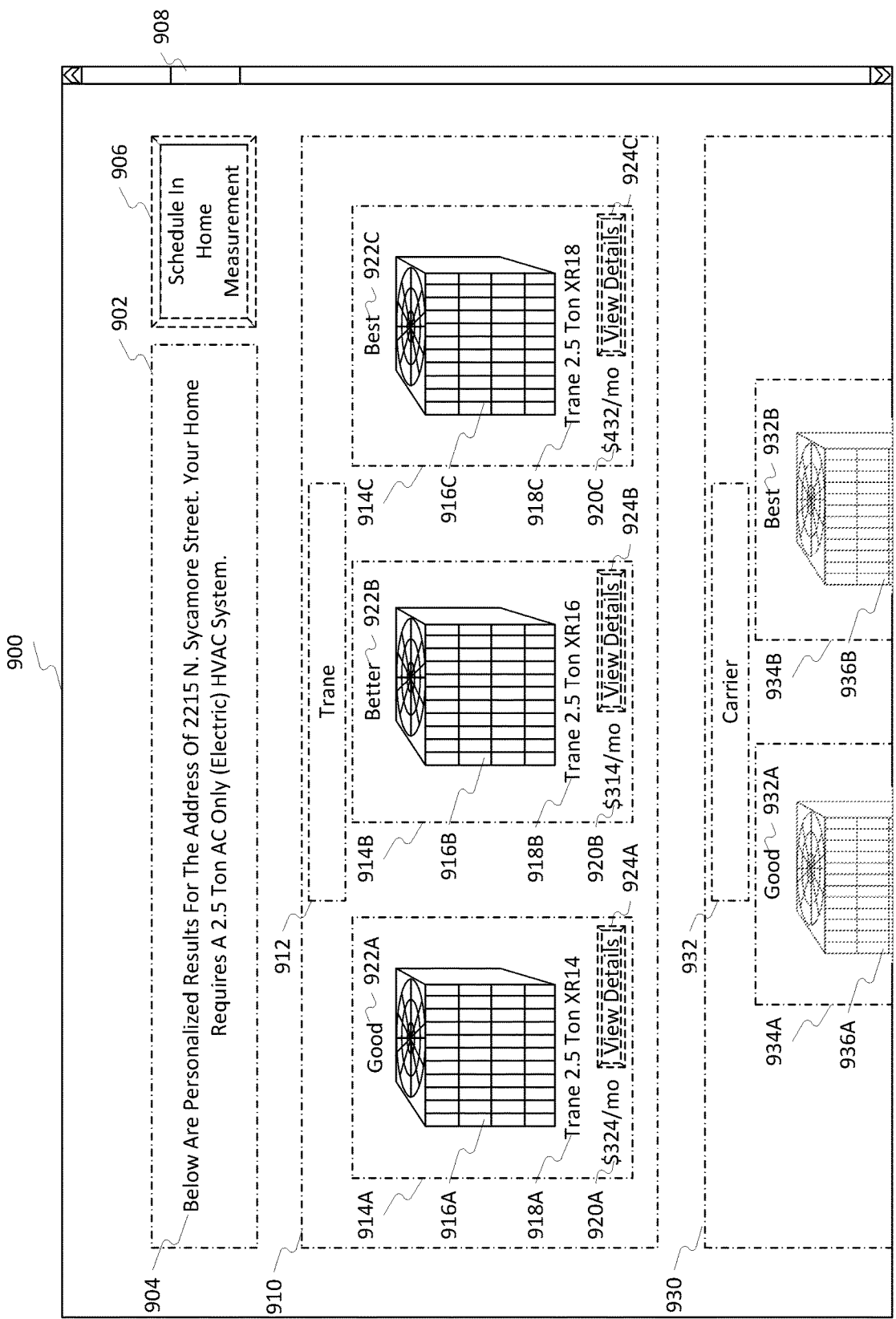
FIG. 9A is an illustration of an exemplary configuration of a GUI consistent with this disclosure.

FIG. 9A is an exemplary schematic showing a display of various information on a GUI 900 consistent with this disclosure. Processing device 202 may be programmed to adjust GUI 304 or GUI 310 to display determined HVAC specifications and one or more HVAC components as shown in FIG. 9A. Processing device 202 may be programmed to generate a new GUI 900 to display instead of or in addition to GUI 304 or GUI 310. Processing device 202 may generate instructions for causing a user device (e.g., user device 104A, 104B, or 104C) to display GUI 900 as part of step 612 of method 600. Additionally or alternatively, processing device 202 may display GUI 900 after completion of method 600, in response to an inquiry by a user, or at a time determined by processing device 202.

GUI 900 may include scroll bar 908. Scroll bar 908 may allow for GUI 900 to be larger than a display area of a device and allow a user to navigate to other areas of GUI 900. In the example of FIG. 9, scroll bar 908 is located on the right side of GUI 900, however, scroll bar 908 may be located anywhere on GUI 900 or may be absent.

GUI 900 may include a results window 902. Results window 902 may be configured to display information determined, identified, or received by processing device 202, for example an identifier received from a user as part of step 606 of method 600, a characteristic determined as part of step 608, a system specification determined as part of step 610, a combination thereof or any other information relating to method 600 or another process for automatically determining HVAC system or component specifications. Results window 902 is depicted as a substantially rectangular window near the top of GUI 900, however, it should be understood that result window 902 may be displayed in any shape, size, or location on GUI 900. In the example of FIG. 9, results window 902 may display message 904. Message 904 may contain information of the type to be displayed in results window 902, as discussed above. Message 904 may take any format, including a textual phrase, a symbol, a chart, a graph, a combination thereof, or any other visual or audible indicator. In FIG. 9, message 904 reads: "Below are personalized results for the address 2215 N. Sycamore Street. Your home requires a 2.5 ton AC Only (Electric) HVAC system." Message 904 contains multiple identifiers of the building (e.g., "2215 N. Sycamore Street" and "AC Only (Electric)") which may have been received form a user, for example, by an input into input window 310 of GUI 304. Message 904 also may also contain the determined specifications (e.g., "2.5 ton") which may have been determined by processing device 202 according to method 600, process 800, process 900, or any other technique disclosed herein. Message 904 also includes information directing a user to other areas of GUI 900 (e.g., "Below"). It is understood that message 904 is exemplary only and any of the components thereof may be rearranged, absent, or displayed more or less prominently. In some embodiments, message 904 may include one or more characteristics associated with the building. For example, message 904 may include a determined square footage (or modified square footage) or other characteristic.

GUI 900 may include a next step button 906. Next step button 906 may include a virtual button that, when activated, directs the user to another GUI or to another page or portion of GUI 900. For example, next step button 906 in FIG. 9, when activated, may direct a user to a system configured to schedule an appointment to have an HVAC technician to measure the building. In other examples, next step button 906 may facilitate the purchase of one or more HVAC components selected by a user, may allow a user to navigate to, for example, GUI 304 in order to adjust or confirm one or more inputs, or to provide another service related to the HVAC system specifications or components.

In FIG. 9A exemplary GUI 900 displays a plurality of HVAC components, the components being grouped according to the manufacturer of each component. It is understood that the HVAC components may be displayed in any other configuration or grouped by any other factor. GUI 900 may include first group display window 910, which may be configured to display one or more HVAC components belonging to a first group. Likewise, GUI 900 may include second group display window 930, which may be configured to display one or more HVAC components belonging to the second group. It is understood that there may be any number of groups and any number of corresponding group display windows.

First group display window 910 may include a group category display region 912. Group category display region 912 may display a name, factor, or other indicator of the relation between the HVAC components of the first group. For example, group category display region 912 may display the name of a first manufacturer of HVAC components when the HVAC components displayed in first group display window 910 are all manufactured by the same manufacturer. For example, group category display region 912 in FIG. 9A is displaying a company name "Trane®," which indicates that all of the HVAC components displayed in first group display window 910 are manufactured or distributed by the company Trane®. The same is true for second group display window 930 and the corresponding group category display region 932, which is displaying the company name "Carrier®."

First group display window 910 may include one or more display regions configured to display an HVAC component and information related to the component. For example, first group display window 910 contains first display region 914A, second display region 914B, and third display region 914C. Each display region may include any amount of information related to one or more HVAC components. For example, each of first display region 914A, second display region 914B, and third display region 914C contains an image of the corresponding HVAC component (e.g., a first image depicting HVAC component 916A, a second image depicting HVAC component 916B, and a third image depicting HVAC component 916C, respectively). Each of first display region 914A, second display region 914B, and third display region 914C also contains a product name and description corresponding with the HVAC component image. For example, in first display region 914A, product description 918A is displayed just below first image 916A. Product description 918A may contain information describing the HVAC component. In FIG. 9A, product description 918A contains the brand name (e.g., "Trane"), the specification of the component (e.g., "2.5 tons"), and a model number (e.g., "XR14"). The same is true for each of product description 918B and product description 918C.

The one or more display regions may include additional information relating to the price, installation, services, or other details relating to the one or more HVAC components. For example, each of first display region 914A, second display region 914B, and third display region 914C contains a monthly price associated with the corresponding HVAC component and a link to additional details related to the HVAC component (or may contain other pricing information). For example, first display region 914A includes monthly price 920A. As discussed above, monthly price 920A may comprise a determined operating price and/or a purchase price of the HVAC component. First display region 914A also includes a virtual button 924A. Virtual button 924A in this example may provide a link to additional details pertaining to HVAC component 916A. It is contemplated that virtual button 924A, when activated by a user, may direct a user to a webpage associated with HVAC component 916A, may display details relating to HVAC component 916A in a pop-up window, may reconfigure GUI 900 to display details related to HVAC component 916A (for example, in first display region 916A, in first display window 910, or in a new display window or region), or the like. It is further contemplated that the additional details displayed in response to activating the virtual button may include technical details, purchasing options, installation instructions, or other information related to the HVAC component.

It is understood that the display regions may include any additional information and that the examples in FIG. 9A are not limiting. For example, one or more of the display regions may include a virtual button, link, or other means for enabling the purchase of the corresponding HVAC component. As another example, one or more of the display regions may include means for selecting one or more HVAC components and comparing the technical details thereof. As another example, one or more of the display regions may include means for contacting a technician to have the corresponding HVAC unit installed in a user's home.

As discussed above, a ranking may be determined for one or more HVAC components based on any number of factors and may comprise a number, symbol, textual description, or other indicator of the ranking. Consistent with this disclosure, the one or more display regions may include an indicator of the rank or recommendation associated with the corresponding HVAC component. For example, first display region 914A contains ranking indicator 922A, second display region 914B contains ranking indicator 922B, and third display region 914C contains ranking indicator 922C. In this example, each ranking indicator 922A, 922B, and 922C comprises a textual ranking (i.e., "Good," "Better," "Best") comparing each HVAC components with the other HVAC components from the same manufacturer. In some embodiments, the HVAC components may be ranked across manufacturers, that is the HVAC components may be ranked from worst to best regardless of the manufacturer.

In the example of FIG. 9A, second display region 914B and third display region 914C contain substantially the same information, prices, and virtual buttons as discussed in relation to first display region 914A and are of substantially the same size as first display region 914A. The only difference may be that each of the display regions contains information relating to a different HVAC component (e.g., HVAC component 916A, HVAC component 916B, or HVAC component 916C). It is contemplated that each display region may contain any other information consistent with this disclosure or may contain less information than shown in FIG. 9A. In some embodiments, each display region 914A, 914B, 914C need not contain the same information or configuration. For example, it is contemplated that third display region 914C, which in this example is associated with the highest ranked HVAC component, may include additional information not included in first display region 914A or second display region 914B, such as an explanation of why it received the highest ranking. Some HVAC components may have features or information that other HVAC components lack, and that information may be displayed in the corresponding display region. For example, HVAC components 916B may have an industry rating, award, or other accolade (e.g., an Energy Star® certification from the U.S. Environmental Protection Agency) which may be displayed in second display region 914B. As another example, one or more of the display regions may include an indicator or whether the corresponding HVAC component meets user preferences (e.g., if a user provides preference for U.S. made products, a U.S. flag may be displayed next to an HVAC component manufactured in the U.S.) In some embodiments, one or more of the display regions may be substantially larger or smaller than the other display regions. For example, third display region 914C may displayed substantially larger than either first display region 914A or second display region 914B because, for example, it is the highest ranked HVAC component from Trane®. In this example, it is contemplated that first display region 914A and/or second display region 914B may contain all of the elements described above, but one or more elements may be smaller, or first display region 914A and/or second display region 914B may lack one or more elements, such as the images depicting HVAC components 916A and 916B.

It is contemplated that first display window 910 may include additional display regions or additional information not shown in FIG. 9A. For example, first display window 910 may include information related to the company, category, or group displayed in a group category display region 912. For example, first display window 910 may include information related to the company Trane®, such as a description provided by the company, pulled from the company website, or so forth. Any of the information discussed above may be displayed in first display window 910 rather than or in addition to being displayed in one of display regions 914A, 914B, or 914C.

GUI 900 may include any number of display windows. For example, GUI 900 includes second display window 930, which may be substantially the same as first display window 910. In FIG. 9A, second display window 930 is only partially displayed on GUI 900. It is contemplated that a user may navigate through GUI 900 to fully display second display window 930. For example, a user may use scroll bar 908 to scroll down GUI 900 until second display window is fully displayed. As discussed above, a user may navigate through GUI 900 by other means, such as by swiping a screen on which GUI 900 is displayed or clicking one or more navigation arrows, scroll bar 908 is exemplary only. In some embodiments, one or more elements of GUI 900 may be static, that is, one or more elements may be displayed on GUI 900 in substantially the same position even if a user navigated through GUI 900. For example, results window 902 and/or next step button 906 may be displayed in substantially the same position as a user scrolls down to view second display window 930.

Second display window 930 may include group category display region 932, which may be substantially the same as group category display region 912. Group category display region 932 may display the name of a second manufacture of one or more HVAC components corresponding with the determined HVAC specifications. For example, group category display region 932 is displaying the company name "Carrier®," which indicates that the HVAC components displayed in group category display window 932 are manufactured or distributed by Carrier®. Second display window 930 may include one or more display regions configured to display one or more HVAC components and information relating thereto. For example, second display window 930 includes first display region 934A and second display region 934B. In this example, first display region 934A includes a ranking indicator 932A and an image corresponding with HVAC component 936A, and second display region 934B includes a ranking indicator 932B and an image corresponding with HVAC component 936B. It is understood that second display window 930 is partially displayed in the example of FIG. 9A and additional features, while not depicted, may be present in second display window 930. For example, second display window 930 may include any of the information discussed in relation to first display window 910.

One of skill in the art having benefit of this disclosure may understand that GUI 900 may include additional display windows consistent with this disclosure. For example, GUI 900 may include a third display window configured to display one or more HVAC components manufactured by a third company and information related thereto, a fourth display window configured to display the same, and so forth.

Figure 9B:
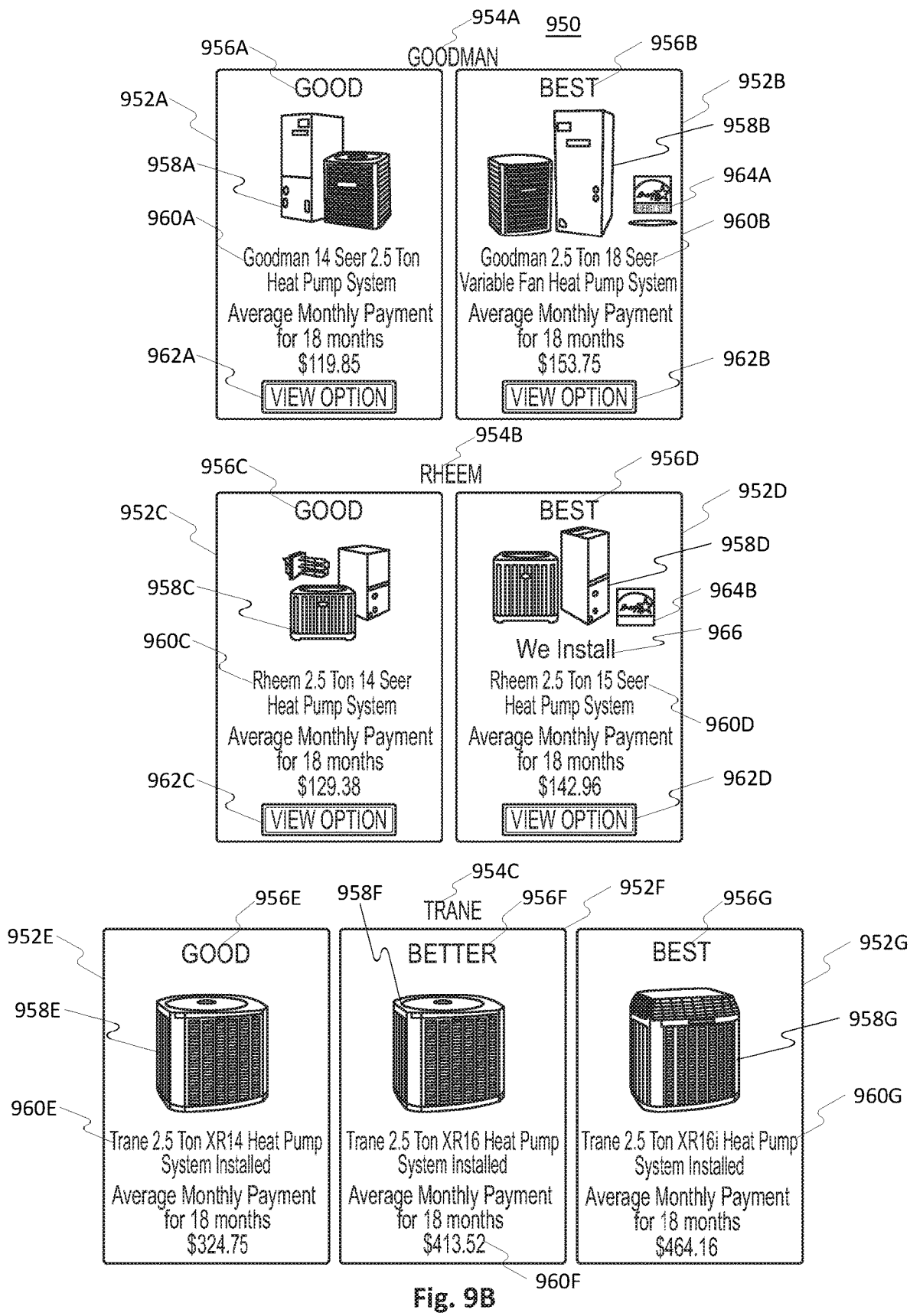
FIG. 9B is an illustration of an exemplary configuration of a GUI consistent with this disclosure.

FIG. 9B is an exemplary display of various information on a GUI 950 consistent with this disclosure. As discussed above, processing device 202 may be programmed to adjust GUI 304 or GUI 310 to display determined HVAC specifications and/or HVAC components as show in FIG. 9B or processing device 202 may be programmed to generate GUI 950 to display rather than or in addition to displaying GUI 304 or GUI 310. Processing device 202 may generate instructions for causing a user device (e.g., user device 104A, 104B, or 104C) to display GUI 950 as part of step 612 of method 600. Additionally or alternatively, processing device 202 may display GUI 950 after completion of method 600, in response to an inquiry by a user, or at a time determined by processing device 202. GUI 950 may be displayed in addition to or instead of GUI 900.

GUI 950 may include one or more display windows 952 configured to display information related to HVAC components that correspond with a determined HVAC specification. When discussing GUI 950, use of a reference number without a corresponding letter is intended to be a reference to each element having that reference number. For example, reference to display windows 952 is a reference to each of display window 952A, 952B, 952C, 952D, 952E, 952F, and 952G. In contrast, reference to display window 952A is a reference to display window 952A to the exclusion of display windows 952B, 952C, 952D, 952E, 952F, and 952G.

Each display window 952 may be configured to display an HVAC system, component, or components that meet the determined HVAC specifications and information relating thereto. In contrast to first display window 910 and second display window 930, which comprised one or more display regions configured to display HVAC component information, each display window 952 may display the HVAC component information. For example, display window 952A may display information substantially similar to that displayed in first region 914A, and display window 952B may display information substantially similar to that displayed in second display region 914B, and so forth.

As shown in GUI 910, display windows 952 may be organized according to the company that manufactures or distributes the corresponding HVAC component. For example, company name 954 may be displayed above one or more display windows 952. This may indicate, for example, that the HVAC components displayed in display windows 952A and 952B are manufactured or distributed by an entity associated with company name 954A (e.g., "Goodman®"), that the HVAC components displayed in display windows 952C and 952D are manufactured or distributed by an entity associated with company name 954B (e.g., "Rheem®"), and that the HVAC components displayed in display windows 952E, 952F, and 952G are manufactured or distributed by an entity associated with company name 954C (e.g., "Trane®"). In some embodiments, company names 954 may be omitted. For example, rather than be organized by association to a brand-name, the HVAC components displayed on GUI 910 may be organized by other groups, by ranking, by price, by availability, by energy efficiency, a combination thereof, or by any other characteristic or feature.

Display windows 952 may include a plurality of information related HVAC components. In some embodiments, each display window 952 may display information relating to a single HVAC component. For example, display window 952A may display information relating to HVAC component 958A, display window 952C may display information relating to HVAC component 958C, and so forth. The information displayed in each display window 952 may include any HVAC specification, component, or system information as well as information relating to the installation or purchase of an HVAC component. For example, each display window 952 includes images depicting HVAC components 958, descriptions 960 of the HVAC components, and ranking indicators 956. For example, display window 952E includes description 960E, which includes a brand name (e.g., "Trane®"), an HVAC specification (e.g., "2.5 Ton"), a model number (e.g., "XR14 Heat Pump"), and a price indicator (e.g., "Average Monthly Payment for 18 Months $324.75") associated with HVAC component 958E. As discussed above, the descriptions 960 may include additional information or omit one or more pieces of information displayed in FIG. 9B.

In some embodiments, each display window 952 may contain substantially the same information as each other display window 952. In some embodiments, each display window 952 may contain any information related to the HVAC component to which it corresponds, which may be substantially different from that of other HVAC components. For example, display window 952B and display window 952D each contain an energy efficiency indicator 964A and 964B respectively, which may indicate that HVAC components 958B and 958D have an energy efficiency certification that HVAC components 958A, 958C, 958E, 958F, and 958G lack. As another example, display window 952D contains availability indicator 966 (e.g., "We Install"), which may indicate that a provider of GUI 910 has HVAC component 956D in stock and/or can install HVAC component 956D for a user of GUI 910. As another example, display windows 952A-952D each contain virtual button 962, which in this example is configured to cause the display of additional information related to HVAC components 958A-958D respectively, where as display windows 952E-952F may omit the virtual button.

In some embodiments, display windows 952 may function as virtual buttons. For example, a click anywhere within display window 952A, such as on the image of HVAC component 958A, may cause GUI 910 to display additional information related to HVAC component 958A, such as technical details, purchase options, and so forth.

The examples discussed in relation to GUI 910 are not limiting and one of skill in the art with the benefit of this disclosure may understand that any configuration of GUI 910 is possible and that GUI 910 may contain any information consistent with this disclosure.

Consistent with this disclosure, the processor may be programmed to transmit any of the information determined, identified, derived, or received to a user device. For example, processing device 202 may transmit the information to a user device via email, Bluetooth, text-message, an alert, or any other means. The transmission may be performed instead of a display on a GUI or in addition to a display on a GUI. For example, processing device 202 may email a user the determined specifications and a list of HVAC components that correspond with the specifications rather than displaying GUI 900.

A non-transitory computer-readable medium may store instructions that, when executed by one or more processors, cause the one or more processors to perform one or more operations consistent with this disclosure. For example, the non-transitory computer-readable medium may contain instructions substantially similar to those discussed in relation to database 114 and memory device 210. In some embodiments, the instructions stored in the non-transitory computer-readable medium may cause one or more processors to perform operations consistent with method 600. For example, the operations the instructions cause the processor to perform may include presenting a processor-generated GUI to a user. The GUI may be generated by any technique disclosed herein. In some embodiments, the GUI may be substantially similar to GUI 304 and/or GUI 500. The operations may further include requesting, through the GUI, information relating to a building where one or more HVAC components are to be installed. For example, one or more prompts (e.g., present prompt 404, present prompt 414, prompt 502, prompt 512, etc.) may be displayed on the GUI. The operations may further include receiving, from the user via an input field associated with the GUI, one or more identifiers associated with the building. The identifier may be any discussed in this disclosure and may be received by any means consistent with this disclosure. For example, a user may input an address through an input field (e.g., input window 310, input field 506, input field 526, etc.) in response to a prompt that request an address associated with a building.

The operations may further include accessing a database and using the one or more identifiers to automatically determine at least one characteristic associated with the building. For example, the instructions on the non-transitory computer-readable medium may cause a processor to access a public API that contains information relating to one or more characteristics and to determine a characteristic based on a received identifier. The database may be any disclosed herein and the characteristic may be any consistent with this disclosure. The operations may further include determining the system specifications for the one or more HVAC components based, at least in part, on the at least one characteristic. The specification may be any consistent with this disclosure. For example, the processor may determine that an HVAC system needs to be of a particular size or have a particular capacity based on a square footage of the building and/or the climate associated with the building. The non-transitory computer-readable medium may store information needed to perform any operations disclosed herein. The operations may further include displaying, on the GUI, the determined system specifications for the one or more HVAC components. The specifications may be displayed by any means consistent with this disclosure and may be displayed with any information relating to the HVAC components. For example, the processor may display GUI 900 and/or GUI 950. One of skill in the art having the benefit of this disclosure may understand that the non-transitory computer-readable medium may contain instructions for performing any other operation, process, or method consistent with this disclosure.

What is claimed is:

1. A method for automatically determining system specifications for one or more HVAC components using a processor-generated graphical user interface (GUI), the method comprising:
   presenting a processor-generated GUI to a user;
   requesting, through the GUI, information relating to a building where one or more HVAC components are to be installed;
   receiving, from the user via an input field associated with the GUI, one or more identifiers associated with the building;
   accessing a database and using the one or more identifiers to automatically determine at least one characteristic associated with the building, wherein automatically determining the at least one characteristic comprises determining, based on accessing of the database, a square footage associated with the building;
   determining the system specifications for the one or more HVAC components based, at least in part, on the at least one characteristic, wherein determining the system specifications comprises:
      determining a modified square footage by multiplying the square footage by a predetermined value corresponding with the number of floors within the building and the number of HVAC controls within the building; and
      determining the system specifications by comparing the modified square footage with one or more system specifications corresponding with geographical HVAC system requirements; and
   displaying, on the GUI, the determined system specifications for the one or more HVAC components.

2. The method of claim 1, wherein the one or more identifiers include at least one of an address associated with the building, a number of pre-existing thermostats in the building, a number of floors or levels within the building, or an indicator of the power source for the HVAC components.

3. The method of claim 1, wherein accessing the database comprises accessing a first database associated with a first entity and accessing a second database associated with a second entity different from the first entity.

4. The method of claim 1, wherein accessing the database comprises accessing a database maintained by a public API provider.

5. The method of claim 4, wherein the public API is accessed via an Internet connection.

6. The method of claim 1, further comprising:
accessing an HVAC product database and automatically determining one or more available HVAC products corresponding with the determined system specifications; and
displaying, on the GUI, the one or more available HVAC products.

7. The method of claim 1, further comprising:
accessing a pricing database and automatically determining a cost estimate for the one or more HVAC components based on the determined system specifications; and
displaying, on the GUI, the cost estimate.

8. The method of claim 1, wherein:
accessing the database further comprises accessing a geographic climate database and using the one or more identifiers associated with the building to determine climate information associated with the building; and
determining the system specifications comprises determining a capacity requirement of one or more HVAC components based on the climate information.

9. A system for automatically determining system specifications for one or more components of an HVAC system using a processor-generated graphical user interface (GUI), the system comprising:
at least one processor programmed to:
generate a GUI;
present the GUI to a user via a display and request, through the GUI, information relating to a building where one or more HVAC components are to be installed;
receive, from the user via an input field associated with the GUI, one or more identifiers associated with the building;
access a database and use the one or more identifiers to automatically determine at least one characteristic associated with the building, wherein automatically determining the at least one characteristic comprises determining, based on accessing of the database, a square footage associated with the building;
determine the system specifications for the one or more HVAC components based, at least in part, on the at least one characteristic, wherein determining the system specifications comprises:
determining a modified square footage by multiplying the square footage by a predetermined value corresponding with the number of floors within the building and the number of HVAC controls within the building; and
determining the system specifications by comparing the modified square footage with one or more system specifications corresponding with geographical HVAC system requirements; and
display, on the GUI, the determined specifications for the one or more HVAC components.

10. The system of claim 9, wherein the one or more identifiers include at least one of an address associated with the building, a number of pre-existing HVAC controls in the building, a number of floors within the building, or an indicator of the power source for the HVAC components.

11. The system of claim 9, wherein accessing the database comprises accessing a database maintained by a public API provider.

12. The system of claim 11, wherein the public API is accessed via the Internet.

13. The system of claim 9, further comprising:
accessing an HVAC product database and automatically determining one or more available HVAC products corresponding with the determined system specifications; and
displaying, on the GUI, the one or more available HVAC products.

14. The system of claim 9, further comprising:
accessing a pricing database and automatically determining cost estimates for the one or more HVAC components based on the determined system specifications; and
displaying, on the GUI, the cost estimates for the one or more available HVAC products.

15. The system of claim 9, wherein
accessing the database further comprises accessing a geographic climate database and using the one or more identifiers associated with the building to determine climate information associated with the building; and
determining the system specifications comprises determining a capacity requirement of one or more HVAC components based on the climate information.

16. A non-transitory computer-readable medium storing instructions that, when executed by one or more processors, cause the one or more processors to perform operations comprising:
presenting a processor-generated GUI to a user;
requesting, through the GUI, information relating to a building where one or more HVAC components are to be installed;
receiving, from the user via an input field associated with the GUI, one or more identifiers associated with the building;
accessing a database and using the one or more identifiers to automatically determine at least one characteristic associated with the building, wherein automatically determining the at least one characteristic comprises determining, based on accessing of the database, a square footage associated with the building;
determining the system specifications for the one or more HVAC components based, at least in part, on the at least one characteristic, wherein determining the system specifications comprises:
determining a modified square footage by multiplying the square footage by a predetermined value corresponding with the number of floors within the building and the number of HVAC controls within the building; and determining the system specifications by comparing the modified square footage with one or more system specifications corresponding with geographical HVAC system requirements; and displaying, on the GUI, the determined system specifications for the one or more HVAC components.

* * * * *